(12) United States Patent
Govindassamy

(10) Patent No.: US 10,531,361 B1
(45) Date of Patent: *Jan. 7, 2020

(54) METHOD AND APPARATUS FOR CONNECTION POOLING AND DISTRIBUTION ACROSS NETWORKS

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/873,350

(22) Filed: Jan. 17, 2018

Related U.S. Application Data

(63) Continuation of application No. 15/867,116, filed on Jan. 10, 2018.

(51) Int. Cl.
*H04W 40/32* (2009.01)
*H04W 84/12* (2009.01)
*H04W 88/16* (2009.01)
*H04W 80/04* (2009.01)

(52) U.S. Cl.
CPC ............ *H04W 40/32* (2013.01); *H04W 80/04* (2013.01); *H04W 84/12* (2013.01); *H04W 88/16* (2013.01)

(58) Field of Classification Search
CPC ..... H04W 76/15; H04W 76/16; H04W 88/06; H04W 40/32
See application file for complete search history.

(56) References Cited

U.S. PATENT DOCUMENTS

| 2016/0081039 A1* | 3/2016 | Lindoff | H04W 52/383 |
| | | | 455/450 |
| 2017/0111952 A1* | 4/2017 | Choi | H04W 76/14 |

* cited by examiner

*Primary Examiner* — Pao Sinkantarakorn
(74) *Attorney, Agent, or Firm* — Lerner, David, Littenberg, Krumholz & Mentlik, LLP

(57) ABSTRACT

Client devices may access internet service from a number of different sources such as mobile broadband networks, Wi-Fi, Ethernet, etc. Client devices generally connect to only one of the available internet services at a time. Client devices may not always be fully accessing the available internet service. A client device may benefit by using the internet service that is available to but not used by other client devices. A method and apparatus are disclosed that enable client devices to coordinate with other client devices and coordinate with the internet service providing entities to pool the internet service from multiple internet service sources through some client devices and distribute to other client devices.

20 Claims, 26 Drawing Sheets

METHOD AND APPARATUS FOR CONNECTION POOLING AND DISTRIBUTION ACROSS NETWORKS

CROSS-REFERENCE TO RELATED APPLICATIONS

This application is a continuation of U.S. application Ser. No. 15/867,116, filed Jan. 10, 2018, the disclosure of which is in corporated herein by reference, and contains subject matter related to copending U.S. application Ser. No. 15/876,558, filed Jan. 22, 2018, copending U.S. application Ser. No. 15/876,528, filed Jan. 22, 2018, copending U.S. application Ser. No. 15/875,417, filed Jan. 19, 2018, copending U.S. application Ser. No. 15/875,383, filed Jan. 19, 2018, copending U.S. application Ser. No. 15/874,416, filed Jan. 18, 2018, copending U.S. application Ser. No. 15/874,446, filed Jan. 18, 2018, and copending U.S. application Ser. No. 15/873,312 filed Jan. 17, 2017.

BACKGROUND

Internet service has become ubiquitous and the means by which it is obtained varies widely. For example, internet service may be provided through a Digital Subscriber Line (DSL), a Data Over Cable Service Interface Specification (DOCSIS) based internet service over cable television system (Cable Modem), a fiber optic network, a wireless communication network, a satellite communication network, etc. When the internet service provides high data transfer rates it is often referred to as broadband internet service. Broadband internet service is generally understood to be a service that is always on and offers data transfer rates on the order of mega-bits per second or higher for both download (DL) and upload (UL).

A client device as defined in the present disclosure is a device that may use the internet service from one or more of the available internet service sources. Such client devices may include conventional client devices such as a smartphone, a tablet, a feature-phone, a laptop or a desktop personal computer, etc. Other client devices may include devices that are embedded within devices that perform other functions. For example, an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, industrial equipment, etc., may include a client device. These types of devices may be collectively referred herein as machine type client devices.

These diverse types of client devices may access the internet service directly through one of the primary sources of internet service as mentioned earlier. Alternatively, a client device may access the internet service through a local network, which may perform distribution of the primary internet service to the users localized in a given area. Examples of such local networks include Local Area Network (LAN) using Ethernet, Wireless LAN (WLAN) commonly known as Wi-Fi, Bluetooth™, Zigbee or some other local area networking schemes. The wireless local networking schemes are collectively referred herein as Short Range Wireless Link (SRWL). The wire-line local networking schemes, such as DSL, Cable Modem, Ethernet, etc. are collectively referred herein as Short Range Cabled Link (SRCL). Both the SRWL and SRCL together are referred to as Short Range Link (SRL). When a client device is in proximity of a location where an SRL access is available, it may access the internet service using it. FIG. 1 illustrates an example scenario of client devices accessing the internet service over a WLAN SRWL that is connected to a traditional wire-line internet service such as a DSL or a DOCSIS Cable Modem. The local area where WLAN service is available is often referred to as a Hotspot. The device that offers the WLAN service in a given local area is referred to as an Access Point (AP). In the present disclosure, the terms Hotspot AP or Hotspot are used interchangeably to refer to the device that offers the WLAN service in a given local area.

A Hotspot AP may be connected to the DSL/DOCSIS Cable Modem through any of the standardized interfaces such as Universal Serial Bus (USB), Ethernet, or proprietary interfaces. In some cases, the DSL/DOCSIS Cable Modem and the Hotspot AP may be part of a single physical device. In such cases, the interface between the DSL/DOCSIS Cable Modem and AP may use Secure Digital Input Output (SDIO) or another suitable interface.

Client devices may also obtain internet service over mobile wireless networks. These mobile wireless networks are often referred to as Wireless Wide Area Network (WWAN). The internet service offered by such networks is often referred to as mobile broadband internet service or simply Mobile Broadband (MB) and the mobile wireless networks are often referred to as mobile broadband networks. The terms WWAN and MB are used interchangeably herein. A WWAN operator may deploy multiple Radio Access Technologies (RATs) such as 3rd Generation Partnership Project (3GPP) Long Term Evolution (LTE), 3GPP Universal Mobile Telecommunications Service (UMTS), Global System for Mobile communication (GSM), Code Division Multiple Access (CDMA), Evolution Data Only/ Evolution Data Optimized (EVDO), etc. Different client devices with different capabilities may connect to the WWAN using different suitable RATs for getting internet service. There may be one or more WWAN operators providing service in a particular geographic area. Each WWAN operator may use the same or different types of RATs. For providing end-to-end services, a WWAN many include, in addition to RATs, other network elements such as gateways and interfaces with other networks. Some client devices may have capability of supporting two Subscriber Identity Modules (SIMs) corresponding to two different WWAN internet service providers. Some client devices with two SIMs may be able to get internet service from two WWANs simultaneously.

As the variety of client devices has increased and the demand for MB service has increased, a device known as a mobile Hotspot is commonly used. A mobile Hotspot device includes both a modem for WWAN and a WLAN AP (Hotspot AP) to distribute the internet service to local client devices. FIG. 2 illustrates the block diagram of an example mobile Hotspot device. As shown in FIG. 2, for the chosen example, the WWAN modem and the Hotspot AP may be connected to each other via one of the standard interfaces used in the industry such as USB, SDIO, or proprietary interfaces. In another mobile Hotspot example, the WWAN modem and the WLAN AP may be an Integrated Circuit (IC) as shown in FIG. 3.

Some mobile Hotspot devices may serve as a single function device, i.e., they may only perform the mobile Hotspot function. Such mobile Hotspots may take many different form factors such as a mobile Hotspot integrated into an automobile, a standalone device that may be carried around with or without a battery, integrated into an accessory device such as a tablet, a standalone device that may be powered by a power wall outlet, etc.

Some client devices have multiple capabilities and being a Hotspot may be one of the capabilities. For example, a smartphone may have a WWAN modem that may be used to get mobile internet service directly from the mobile broadband network as illustrated in FIG. 4. The flow of data is as shown in FIG. 4 from the mobile broadband modem to the application processor that processes the download and upload application data and interacts with the user via the display and other elements of the user interface such as touch-screen, audio, vibration, etc. The smartphone may also have a WLAN modem to access internet service over a Hotspot AP. When it is near a Hotspot AP, it may use internet service from a Hotspot as illustrated in FIG. 1. In another smartphone example, the mobile broadband modem, the WLAN AP and the Application Processor may be an integrated device as shown in FIG. 5.

A smartphone may also serve as a mobile Hotspot to provide internet service over WLAN to other client devices in its vicinity. FIG. 6 illustrates an example scenario where the smartphone serves as a mobile Hotspot and provides internet service to a nearby client device that may have only the WLAN access. In another smartphone mobile hotspot example, the mobile broadband modem, the WLAN AP and the Application Processor may be integrated into a single IC as shown in FIG. 7.

A client device may have capability to access internet service from many different sources. For example, a client device may have capability to access internet service from a WWAN using any of the supported RATs, a WLAN, an Ethernet based LAN, a fiber-optic network, and a satellite based system. Some client devices may have capability to access internet service using only a subset of the above sources of internet service.

A client device may go in and out of the coverage of and internet service from a Hotspot or mobile Hotspot and seamlessly maintain the continuity of internet service by switching over to the WWAN when not connected to or not getting service from a Hotspot or mobile Hotspot.

To control congestion and to provide a proportionally fair internet service according to the type of subscription of each client device, an internet service provider, such as a WWAN operator, may exercise some sort of metering and throttling procedures. This type of procedures may be used regardless of whether a user may have subscribed to unlimited internet service or not.

A common feature among the conventional client devices is that they connect to only one source of internet service at a time. For example, if a client device has internet service available from both WWAN and WLAN, it may only get the internet service from one of those sources. In most cases the user may be already paying for the internet service from each of the internet sources from which the internet service may be available. For example, a user may be already paying for the WWAN service as well as DSL based WLAN internet service at home. Therefore, by using both the WWAN and WLAN services simultaneously the user may not be incurring any additional costs.

The internet data traffic carried over the local networking technologies such as Ethernet, WLAN, Bluetooth™, etc. is essentially free because these networks are locally deployed by the user in a home or by an employer in a work place. For example, when two users in a local area are connected to the same Hotspot AP of a WLAN and when they communicate with each other, the data packets of the communication may not go outside the local network. In such local communications, external entities may not be required. In such cases the communication between the client devices in a local area is free of cost. Furthermore, the communication latency may be much lower due to lack of involvement from external entities.

SUMMARY

A method and apparatus are disclosed that enable a network device to provide internet service through multiple sources of internet to a client device. A method and apparatus are disclosed that enable a client device to get internet service from multiple sources of internet. The multiple internet sources may include the same internet source or different internet sources but the internet service may be delivered over multiple parallel paths between the internet service provider's network and the client devices.

In accordance with an aspect of the present disclosure, a method may control connection pooling and distribution of internet service from a plurality of communication networks available respectively at a plurality of client devices, in which the client devices are configured to access a Hotspot Access Point via respective Short Range Links (SRLs) and participate in a pooling and distribution (PD) mode of operation as part of a PD group, in which the PD group includes a first client device of the client devices and at least one second client device of the client devices, in which the internet service from a first communication network of the plurality of communication networks is available at the first client device, and in which in the PD mode operation for the PD group, the internet service from at least one second communication network of the plurality of communication networks available at the at least one second client device is shared with the first client device according to a first coordination request from a Master Client Application Gateway (CAGW) of the first client device to a Donor CAGW of the at least one second client device requesting the Master CAGW be a beneficiary of the internet service from the at least one second communication network available at the at least one second client device, the method comprising: controlling, by a processing device as a first Network Application Gateway (NAGW) of the first communication network, in response to a second coordination request from the Master CAGW when coordination between the Master CAGW and the Donor CAGW of the at least one second client device according to the first coordination request is successfully completed, coordinating for sharing the internet service from the at least one second communication network in the PD mode of operation for the PD group, wherein the coordinating for sharing includes receiving from the Master CAGW, via the first communication network, data transfer coordination information for the at least one second communication network and the at least one second client device, wherein the coordinating for sharing includes exchanging coordination parameter information including the data transfer coordination information with at least one second NAGW of the at least one second communication network, via at least one second interface between the first NAGW and the at least one second NAGW, for coordinating data transfer with the Donor CAGW of the at least one second client device to share the internet service from the at least one second communication network available at the at least one second client device, such that, in the PD mode of operation for the PD group, a first given data packet intended for the first client device is transmitted from an Application Server to the first NAGW, is transmitted by the first NAGW to a Packet Data Network (PDN) Gateway (GW) of a given one of the at least second communication network, is transmitted via the internet service from the given one of the at least one second communication network available at a given one of at least one second client device to the Donor CAGW of the given one of the at least one second client device, and is transmitted by the Donor CAGW of the given one of the at least one second client device via the Hotspot Access Point to the Master CAGW of the first client device, and a second given data packet from the Master CAGW of the first client device is transmitted via the Hotspot Access Point to the Donor CAGW of the given one of the at least one second client device, is transmitted by the Donor CAGW of the given one of at least one second client device via the internet service from the given one of the at least one second communication network available at the given one of at least one second client device to the PDN GW of the given one of the at least one second communication network, is transmitted from the PDN GW of the given one of the at least second communication network to the first NAGW, and is transmitted from the first NAGW to the Application Server.

In one alternative, the first and the at least one second communication networks may be different first and second Wireless Wide Area Networks (WWANs), and wherein the first and the at least one second communication networks may have a same or different type of radio access technology (RAT).

In one alternative, the first NAGW and the at least one second NAGW may be included in a first PDN GW and at least one second PDN GW, respectively.

In one alternative, the first and the at least one second communication networks may be different network types, in which the network types include at least two of a wire-line network, a satellite communication network and a Wireless Wide Area Network (WWAN).

In one alternative, the processing device may be inside a PDN GW of a Wireless Wide Area Network (WWAN) as the first communication network at an Internet Protocol (IP) layer.

In one alternative, the processing device may be in an apparatus in a data packet flow path between the client devices and the Application Server.

In one alternative, the coordinating for sharing the internet service from the at least one second communication network may include receiving, from the Master CAGW of the first client device, information including at least one of Media Access Control (MAC) addresses, IP addresses, International Mobile Subscriber Identity (IMSI), Download (DL) bandwidth to be shared, actual DL bandwidth shared or Upload (UL) bandwidth to be shared of the at least one second client device.

In one alternative, the coordinating for sharing the internet service from the at least one second communication network may include receiving, from the Master CAGW of the first client device, information indicating a portion of the internet service from the at least one second communication network available at the at least one second client device to be shared in the PD mode of operation.

In one alternative, the method may further include controlling, by the processing device, coordinating the PD mode of operation for the PD group with the Master CAGW of the first client device to complete the coordinating for sharing the internet service from the at least one second communication network such that internet data packet transfer via the at least one second communication network in the PD mode of operation for the PD group can begin, in which the Application Server uses an IP address of the first client device as a destination IP address in each data packet transmitted to a PDN GW of the first communication network; and determining routing of each data packet from the Application Server to each of the at least one second client device based on predetermined parameters established during the coordinating for sharing the internet service from the at least one second communication network in the PD mode of operation for the PD group.

In one alternative, the method may further include controlling, by the processing device, creating a dedicated PDN connection for each of the at least one second client device and the first client device to route to or from the Master CAGW a first IP data packet belonging to the first client device.

In one alternative, the method may further include controlling, by the processing device, using the dedicated PDN connections respectively with the of the at least one second client device and the first client device to (i) identify the first IP data packet belonging to the first client device in the PD mode of operation of the PD group, and (ii) route the first IP data packet from the Master CAGW to the Application Server.

In one alternative, the processing device may be inside a PDN GW of the first communication network as a WWAN at an Internet Protocol (IP) layer, and the method may further include: controlling, by the processing device, re-order operations at the IP layer on application level second data packets transmitted in the PD mode operation for the PD group in upload directions via respective dedicated PDN connections.

In one alternative, the method may further include controlling, by the processing device, maintaining a timer to discard out of order IP data packets which are pending to be received, to re-order IP layer data packets in an upload direction.

In one alternative, the method may further include controlling, by the processing device, terminating the PD mode of operation with a given Donor CAGW of the at the least one second client device when the given Donor CAGW is unresponsive over a predetermined period.

In one alternative, the method may further include controlling, by the processing device, when the PD mode of operation with the given Donor CAGW is terminated, informing the Master CAGW about removal of the given Donor CAGW from the PD group.

In one alternative, the method may further include controlling, by the processing device, terminating the PD mode of operation with the Master CAGW and each of the Donor CAGW in the PD group, when the Master CAGW is unresponsive over a predetermined period.

In one alternative, the method may further include controlling, by the processing device, enabling the PD mode of operation for the PD group.

In one alternative, a given SRL for a given client device of the client devices may be configured by Bluetooth, Zigbee, Ethernet, USB or a Wireless Local access network (WLAN).

In accordance with an aspect of the present disclosure, an apparatus may control connection pooling and distribution of internet service from a plurality of communication networks available respectively at a plurality of client devices, in which the client devices are configured to access a Hotspot Access Point via respective Short Range Links (SRLs) and participate in a pooling and distribution (PD) mode of operation as part of a PD group, in which the PD group includes a first client device of the client devices and at least one second client device of the client devices, in which the internet service from a first communication network of the plurality of communication networks is available at the first client device, and in which in the PD mode operation for the PD group, the internet service from at least one second communication network of the plurality of communication networks available at the at least one second client device is shared with the first client device according to a first coordination request from a Master Client Application Gateway (CAGW) of the first client device to a Donor CAGW of the at least one second client device requesting the Master CAGW be a beneficiary of the internet service from the at least one second communication network available at the at least one second client device, and the apparatus may be configured as a Network Application Gateway (NAGW) of the first communication network and include: circuitry configured to control: in response to a second coordination request from the Master CAGW when coordination between the Master CAGW and the Donor CAGW of the at least one second client device according to the first coordination request is successfully completed, coordinating for sharing the internet service from the at least one second communication network in the PD mode of operation for the PD group, wherein the coordinating for sharing includes receiving from the Master CAGW, via the first communication network, data transfer coordination information for the at least one second communication network and the at least one second client device, wherein the coordinating for sharing includes exchanging coordination parameter information including the data transfer coordination information with at least one second NAGW of the at least one second communication network, via at least one second interface between the first NAGW and the at least one second NAGW, for coordinating data transfer with the Donor CAGW of the at least one second client device to share the internet service from the at least one second communication network available at the at least one second client device, such that, in the PD mode of operation for the PD group, a first given data packet intended for the first client device is transmitted from an Application Server to the first NAGW, is transmitted by the first NAGW to a Packet Data Network (PDN) Gateway (GW) of a given one of the at least second communication network, is transmitted via the internet service from the given one of the at least one second communication network available at a given one of at least one second client device to the Donor CAGW of the given one of the at least one second client device, and is transmitted by the Donor CAGW of the given one of the at least one second client device via the Hotspot Access Point to the Master CAGW of the first client device, and a second given data packet from the Master CAGW of the first client device is transmitted via the Hotspot Access Point to the Donor CAGW of the given one of the at least one second client device, is transmitted by the Donor CAGW of the given one of at least one second client device via the internet service from the given one of the at least one second communication network available at the given one of at least one second client device to the PDN GW of the given one of the at least second communication network, is transmitted from the PDN GW of the given one of the at least second communication network to the first NAGW, and is transmitted from the first NAGW to the Application Server.

In accordance with an aspect of the present disclosure, a wireless communication device may include a receiver to receive a wireless communication; and a processing device configured for controlling connection pooling and distribution of internet service from a plurality of communication networks available respectively at a plurality of client devices, in which the client devices are configured to access a Hotspot Access Point via respective Short Range Links (SRLs) and participate in a pooling and distribution (PD) mode of operation as part of a PD group, in which the PD group includes a first client device of the client devices and at least one second client device of the client devices, in which the internet service from a first communication network of the plurality of communication networks is available at the first client device, and in which in the PD mode operation for the PD group, the internet service from at least one second communication network of the plurality of communication networks available at the at least one second client device is shared with the first client device according to a first coordination request from a Master Client Application Gateway (CAGW) of the first client device to a Donor CAGW of the at least one second client device requesting the Master CAGW be a beneficiary of the internet service from the at least one second communication network available at the at least one second client device. The processing device may be is configured as a Network Application Gateway (NAGW) of the first communication network to control: in response to a second coordination request from the Master CAGW when coordination between the Master CAGW and the Donor CAGW of the at least one second client device according to the first coordination request is successfully completed, coordinating for sharing the internet service from the at least one second communication network in the PD mode of operation for the PD group, wherein the coordinating for sharing includes receiving from the Master CAGW, via the first communication network, data transfer coordination information for the at least one second communication network and the at least one second client device, wherein the coordinating for sharing includes exchanging coordination parameter information including the data transfer coordination information with at least one second NAGW of the at least one second communication network, via at least one second interface between the first NAGW and the at least one second NAGW, for coordinating data transfer with the Donor CAGW of the at least one second client device to share the internet service from the at least one second communication network available at the at least one second client device, such that, in the PD mode of operation for the PD group, a first given data packet intended for the first client device is transmitted from an Application Server to the first NAGW, is transmitted by the first NAGW to a Packet Data Network (PDN) Gateway (GW) of a given one of the at least second communication network, is transmitted via the internet service from the given one of the at least one second communication network available at a given one of at least one second client device to the Donor CAGW of the given one of the at least one second client device, and is transmitted by the Donor CAGW of the given one of the at least one second client device via the Hotspot Access Point to the Master CAGW of the first client device, and a second given data packet from the Master CAGW of the first client device is transmitted via the Hotspot Access Point to the Donor CAGW of the given one of the at least one second client device, is transmitted by the Donor CAGW of the given one of at least one second client device via the internet service from the given one of the at least one second communication network available at the given one of at least one second client device to the PDN GW of the given one of the at least second communication network, is transmitted from the PDN GW of the given one of the at least second communication network to the first NAGW, and is transmitted from the first NAGW to the Application Server.

DETAILED DESCRIPTION

Figure 1:
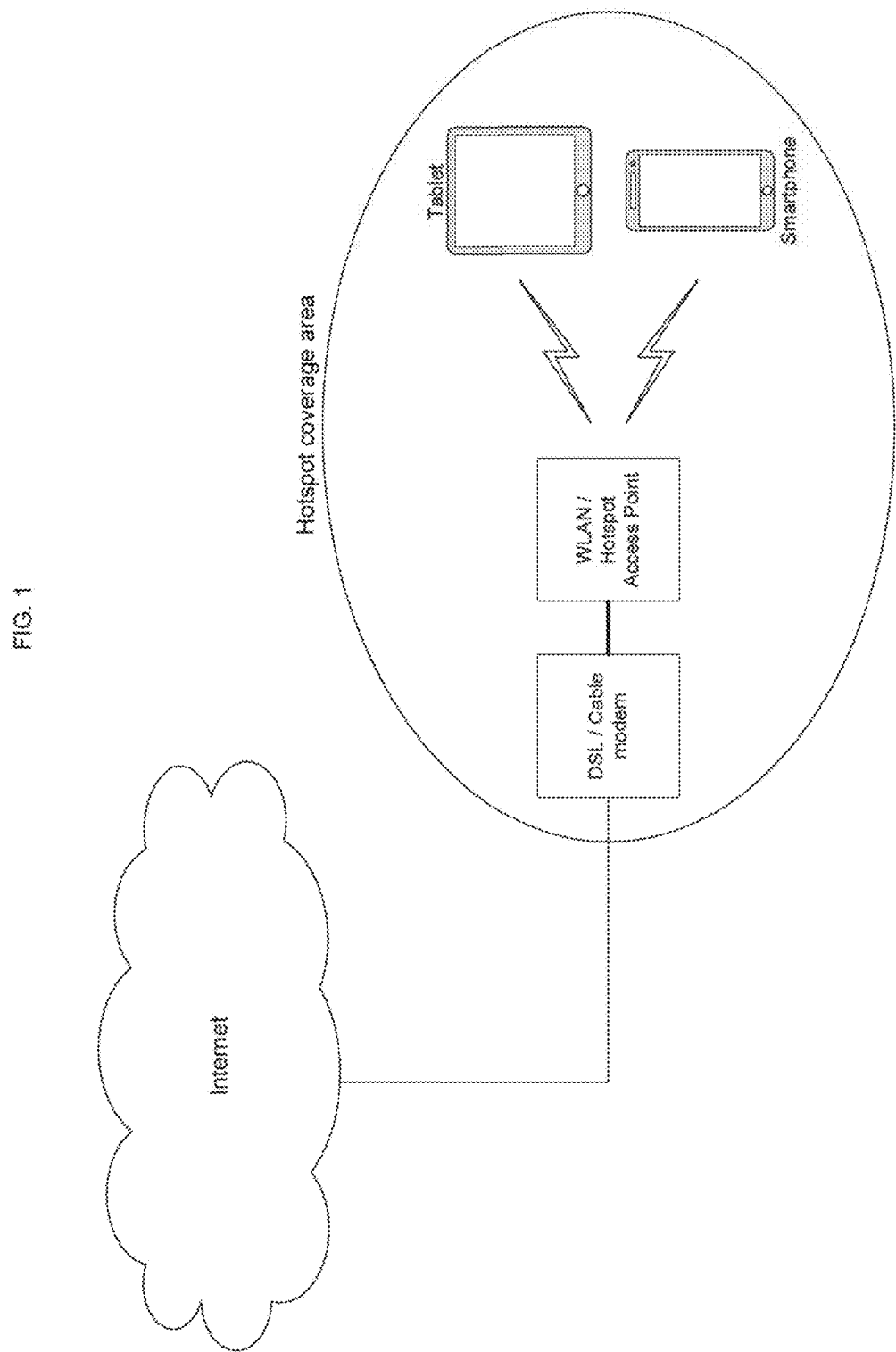
FIG. 1 illustrates an example scenario of internet access using Wireless Local Area Network (WLAN) over a traditional wire-line internet service.
Figure 2:
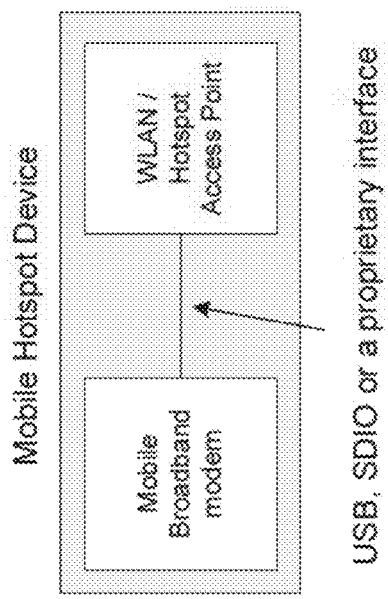
FIG. 2 illustrates a high-level block diagram of an example mobile Hotspot device.
Figure 3:
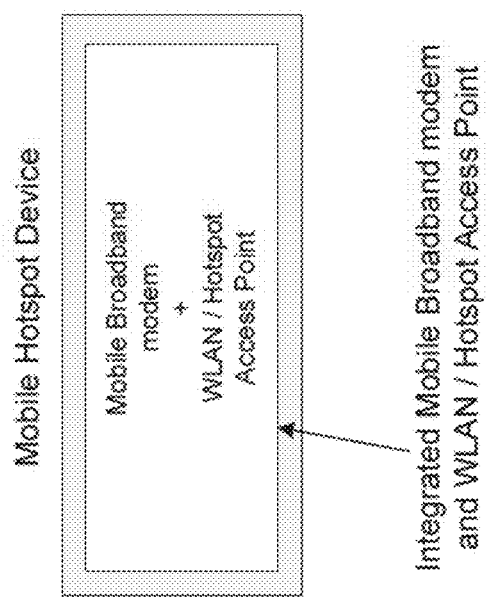
FIG. 3 illustrates a high-level block diagram of an example mobile Hotspot device with an integrated mobile broadband modem and WLAN Access Point (AP).
Figure 4:
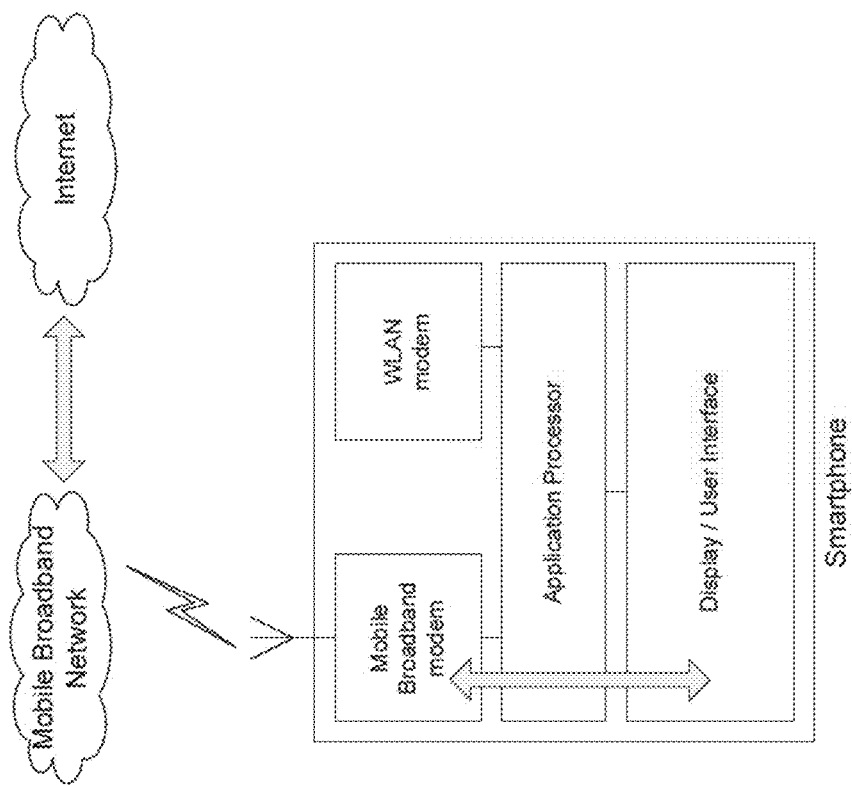
FIG. 4 illustrates a use case of internet access over a mobile broadband network by a smartphone client device.
Figure 5:
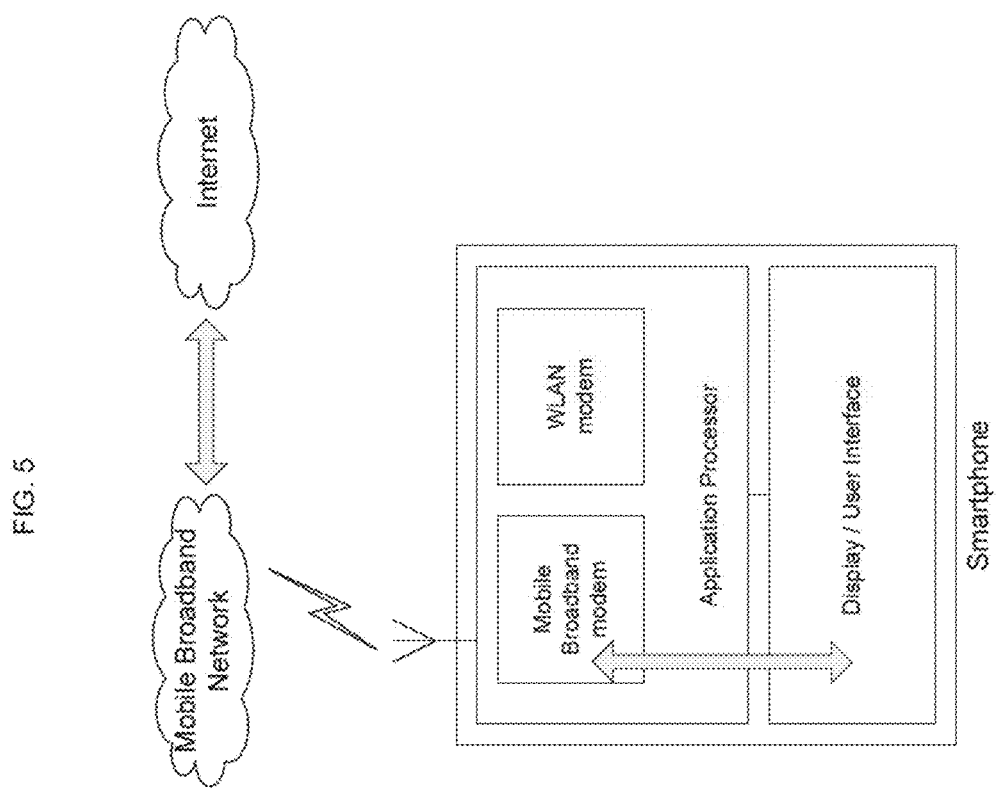
FIG. 5 illustrates a use case of internet access over a mobile broadband network by a smartphone client device with an integrated mobile broadband modem, WLAN Access Point, and Application Processor.
Figure 6:
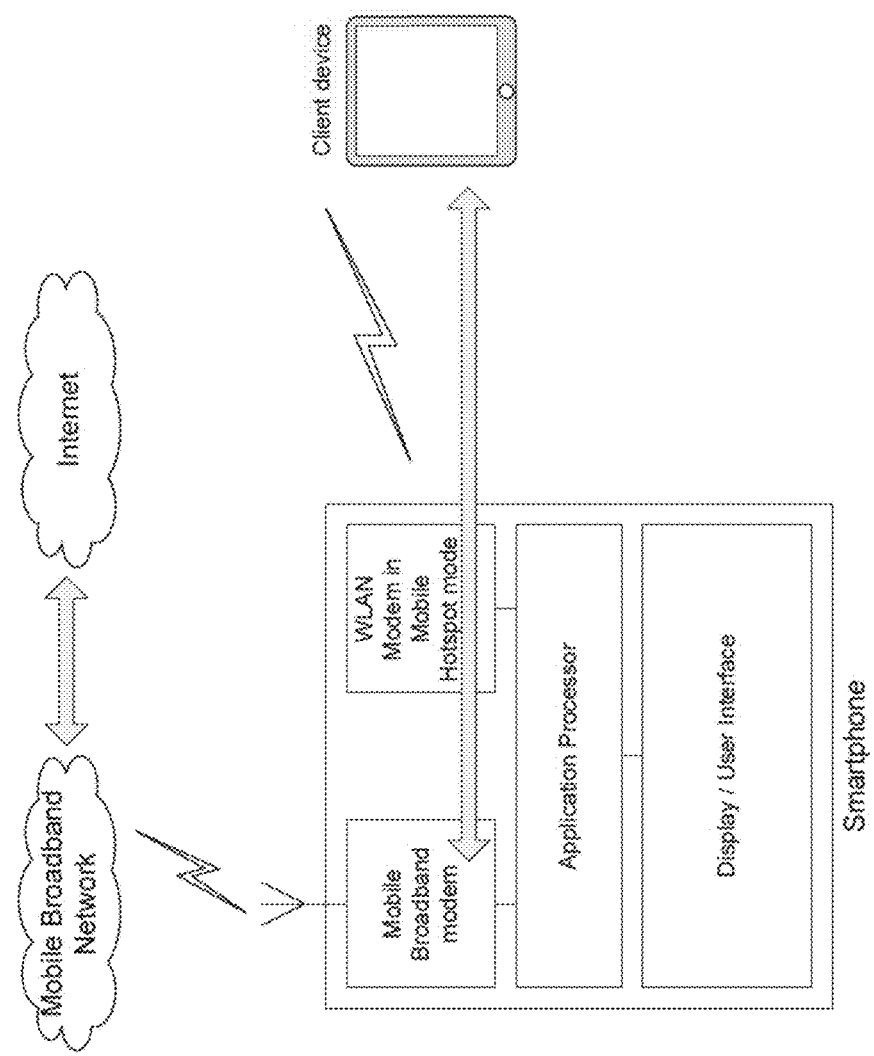
FIG. 6 illustrates a use case of internet access over a WLAN network by a client device through a smartphone operating in mobile Hotspot mode.
Figure 7:
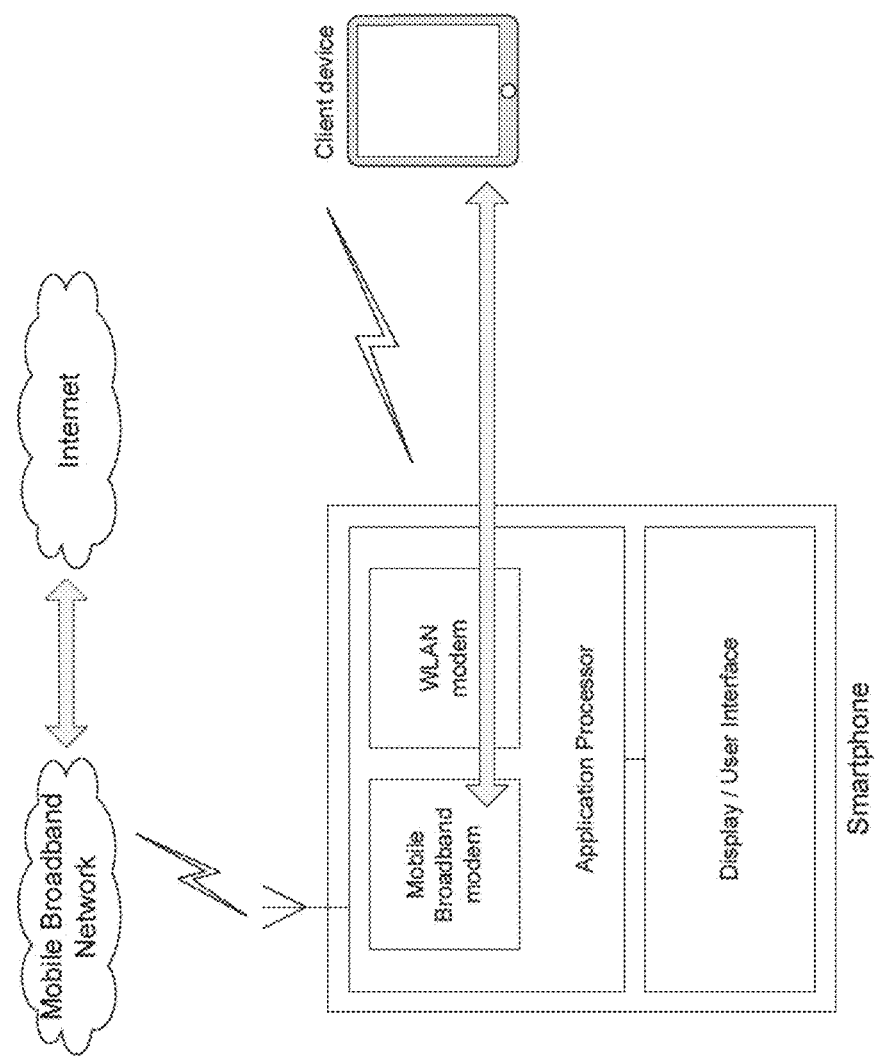
FIG. 7 illustrates a use case of internet access over a WLAN network by a client device through a smartphone operating in mobile Hotspot mode with an integrated mobile broadband modem, WLAN Access Point, and Application Processor.

The foregoing aspects, features and advantages of the present disclosure will be further appreciated when considered with reference to the following description of exemplary embodiments and accompanying drawings, wherein like reference numerals represent like elements. In describing the exemplary embodiments of the present disclosure illustrated in the appended drawings, specific terminology will be used for the sake of clarity. However, the present disclosure is not intended to be limited to the specific terms used.

Although aspects of the present disclosure are illustrated using a particular type of client devices and communication networks, the present disclosure is applicable to any type of client devices and communications networks some of which are mentioned in an earlier section in the present disclosure.

Examples of some use cases of different available internet service sources and different client devices that may avail the internet services are listed below:
  a) Multiple client devices connected to single or different WWANs using a single RAT (for example, 3GPP LTE) and connected to a single WLAN in a particular Hotspot area.
  b) Multiple client devices connected to single or different WWANs using different RATs (3GPP LTE, 3GPP UMTS, etc.) and connected to a single WLAN in a particular Hotspot area.
  c) One or more client devices connected to a single or different WWANs using different RATs (3GPP LTE, 3GPP UMTS, etc.) and one or more client devices connected to a different source of primary internet service such DSL, DOCSIS Cable Modem, satellite, or fiber optic network. All client devices connected to a single WLAN in a particular Hotspot area.
  d) A single client device with internet access to multiple sources of internet service and running one or more applications.
  e) Multiple client devices connected over WLAN for internet service and one of the client devices has other sources of internet service as well and each client device may be running one or more applications.

Figure 8:
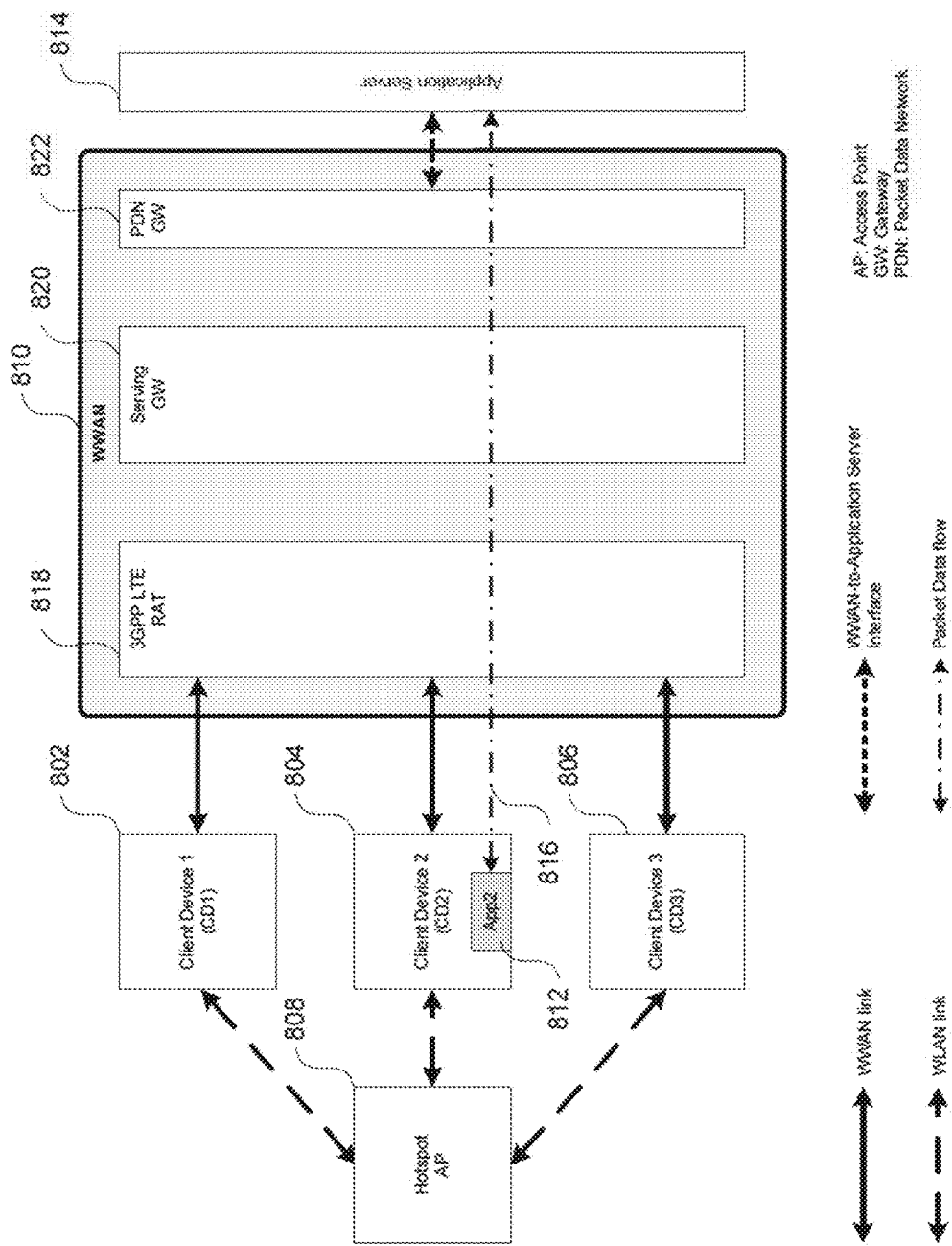
FIG. 8 illustrates a use case of multiple client devices capable of mobile broadband (MB) connection over a Wireless Wide Area Network (WWAN) and a WLAN in the coverage area of a Hotspot AP.

The example use case a) above is illustrated in FIG. 8 in which three different client devices are capable of WWAN and WLAN connections. The three client devices CD1 802, CD2 804, and CD3 806 are in the coverage area of the Hotspot AP 808 and connected to it. They are also connected to the WWAN 810 using 3GPP LTE RAT 818. In one scenario of FIG. 8, the client device CD2 may be running an active application App2 812 and the client device CD1 and client device CD3 may not be running any active applications.

An example of normal flow of data packets 816 is also illustrated in FIG. 8 when the App2 812 in client device CD2 804 is performing data transfer with the Application Server 814 through the WWAN 810 which includes the 3GPP LTE RAT 818, the Serving Gateway (GW) 820 and the Packet Data Network (PDN) GW 822. The PDN GW is the primary interface between various, wired and wireless, packet data networks. A number of entities and protocol layers may be involved in the entire data packet flow between Application Server 814 and the App2 812 in client device CD2 804.

Figure 9A:
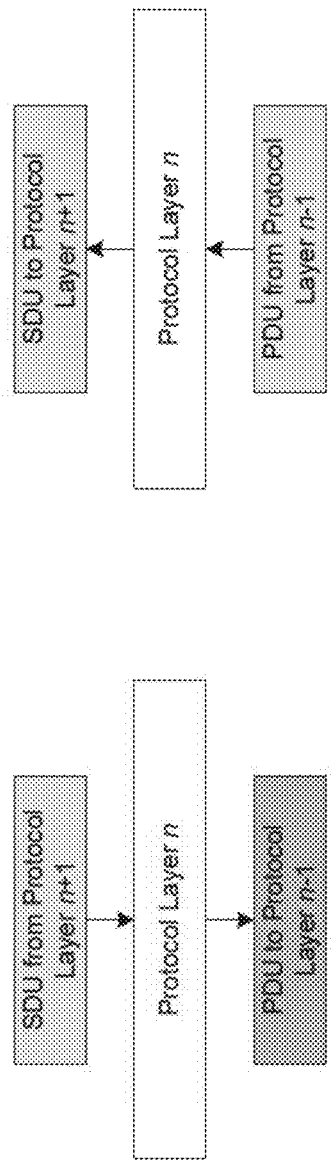
FIG. 9A illustrates a layered architecture of a data communication system.

The services and features of data communication systems may be implemented in distinct layers. The data packets given by the application or upper layer of any protocol entity may be referred as Service Data Unit (SDU) and the data unit provided to the lower layer is referred to as Protocol Data Unit (PDU) as shown in FIG. 9A. On the transmission side a protocol entity works on the SDU as the input and performs data packet processing and outputs a PDU. On the receiving side, a protocol entity works on a PDU as the input and performs data packet processing and produces an SDU as the output. The data packet processing on the transmission side may add headers or footers or both to the SDU. The data packet processing on the reception side may remove headers or footers or both from the PDU and provides an SDU to the application or upper layer. The protocol entities communicate with each other using one of the common service primitive types such as REQ (Request), IND (indication), RSP (Response), and CNF (Confirm). The entity that initiates a service request from another peer entity may use the REQ primitive towards its lower layer. The lower layer of the peer entity may use the IND service primitive to inform the peer entity about the received REQ service primitive. For example, the REQ service primitive may be requesting the identity of the peer entity. When the peer entity is ready with a response, it uses the RSP service primitive along with the requested information towards its lower layer. The entity that initiated the original service request, receives the response from the peer entity through its own lower layer using the service primitive CNF which may include the requested information.

Regardless of the type of network, the processing and communication of data packets follow general layered model specified by the Open Systems Interconnection (OSI) as follows:
  Layer 1: Physical Layer
  Layer 2: Data Link Layer
  Layer 3: Network Layer
  Layer 4: Transport Layer
  Layer 5: Session Layer
  Layer 6: Presentation Layer
  Layer 7: Application Layer From the above the layered OSI model, the data packet termination can be either at the Data Link layer or at the Network layer or at higher layers depending on the type of particular network. The higher layers may terminate in the client devices on one end and on the Application Server on the other end of communication.

Typically in wireless communication systems, the protocols are defined such that the data packets terminate at the Data Link layer in the RAT protocols of the WWAN. For example, in 3GPP LTE RAT the data packet terminates at Packet Data Convergence Protocol (PDCP) layer as a PDCP data packet and there the Internet Protocol (IP) data assembly/re-assembly is done to pass the IP data packet to the upper layers. In CDMA RAT the data packet terminates at Radio Link Protocol (RLP) layer. Above the Data Link layer, upper layer protocols, such as Transmission Control Protocol (TCP) and Internet Protocol (IP) are common within and across different networks. As such the PDCP and RLP layers correspond to a part of Data Link layer of the OSI reference model.

Figure 9B:
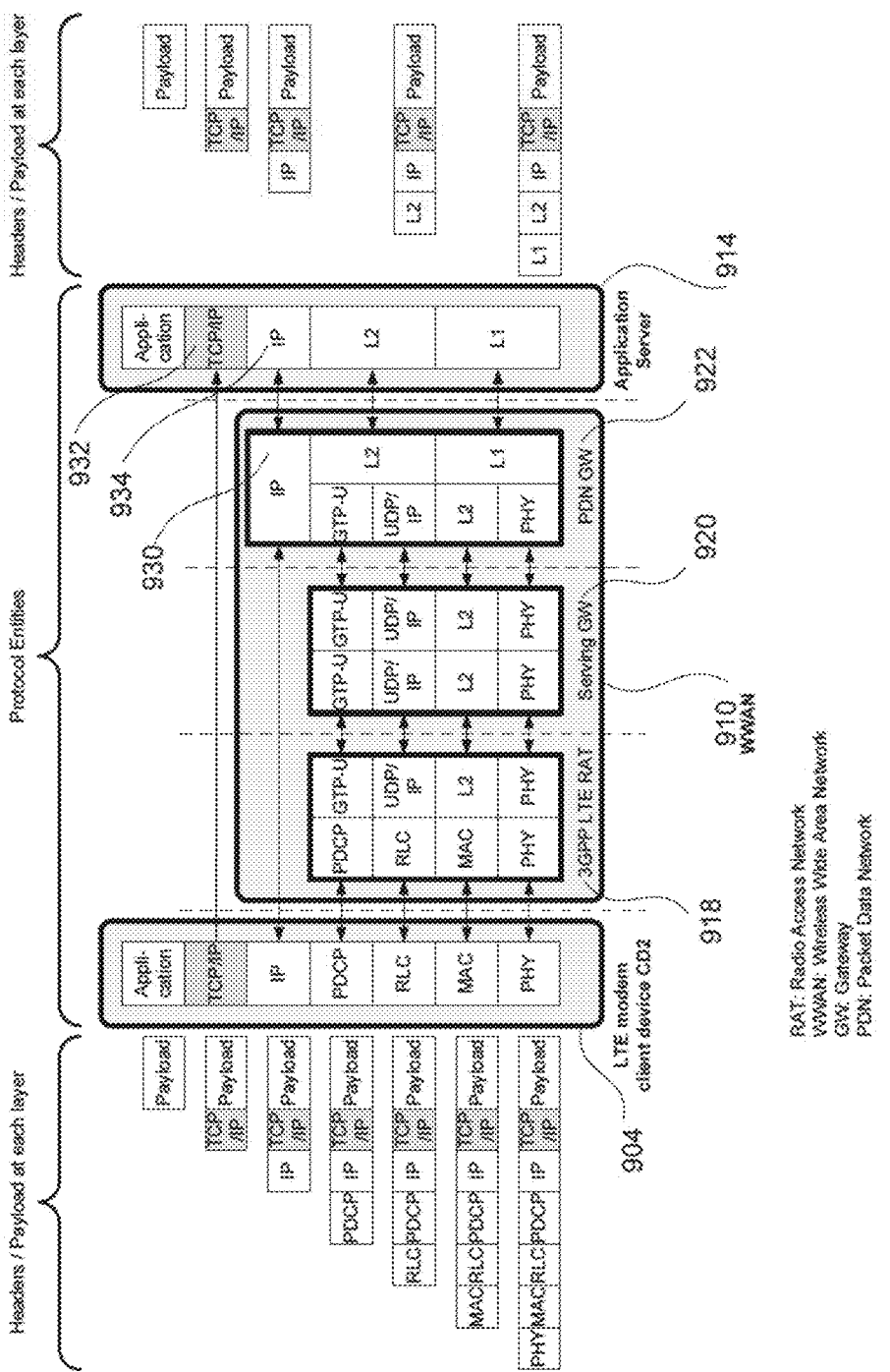
FIG. 9B illustrates data packet flow and protocol entities involved in the case of a single client device engaged in active data communication with the Application Server over a WWAN.

In FIG. 9B the key protocol entities involved in the data packet flow at the Application Server 914 are illustrated along with the various headers that are added/removed to/from the payload. Similarly, the key protocol entities involved in the data packet flow at the client device CD2 904 are illustrated along with the various headers that are added/removed to/from the payload. Similar headers are added/removed but not illustrated for the various protocol entities within the WWAN 910. Note that the 3GPP LTE RAT 918, comprising a set of base stations and other elements, is one of the entities within the WWAN which may include other entities such as Serving GW 920 and Packet Data Network (PDN) GW 922.

The destination IP address used in the TCP/IP layer 932 in the Application Server 914 is the IP address of the client device CD2 904. On the other hand, the IP address used in the IP layer 934 in the Application Server 914 is the IP address of the PDN GW 922 to which it directly interfaces. The IP protocol layer 930 in the PDN GW 922 may use the IP address contained in the TCP/IP header, inserted by the TCP/IP layer 914, to make further routing decision within the WWAN to eventually route the data packet to the client device CD2 904.

The various protocol entities illustrated in FIG. 9B may use protocols at various layers of a data communication system standardized by organizations such as 3GPP, Internet Engineering Task Force (IETF), the Institute of Electrical and Electronics Engineers (IEEE), etc. The LTE modem inside client device CD2 uses the physical (PHY) layer, Media Access Control (MAC) layer, Radio Link Control (RLC) layer, and Packet Data Convergence Protocol (PDCP) layer protocols defined by the 3GPP for the LTE Radio Access Technology. The same peer protocol entities are present in the 3GPP LTE RAT 918 of the WWAN 910. In IEEE 802.11 WLAN, the Logical Link Control (LLC) layer implements functionality that is similar to that of the RLC layer in 3GPP LTE RAT.

The IP is the most widely used protocol for the Network layer of the OSI model of data communication systems. Similarly, TCP and UDP are the most widely used protocols for the Transport layer of the OSI model.

The WWAN may use standardized protocols for interfaces that involve external entities, such as client devices or Application Servers. For communication with different internal entities, the WWAN may use standardized or proprietary protocols. For example, the 3GPP LTE RAT 918 in the WWAN 910 uses 3GPP standardized protocols when communicating with the client devices. But when the 3GPP LTE RAT communicates with the Serving GW 920, it may use different protocols. In the example illustrated in FIG. 9B, the generic PHY and layer 2 (L2) protocol entities are shown for communication between the Serving GW 920 and 3GPP LTE RAT 918. The Network layer and the Transport layers may use IP and UDP as shown in FIG. 9B. The GPRS Tunneling Protocol for User data (GTP-U) is a protocol for transporting data packets among different entities within a network and across different RATs of the same network. The PDN GW 922 may use the required protocols to interface with the Application server 914. The layer 1 (L1) and layer 2 (L2) protocols may be standardized or WWAN proprietary. The higher layers may generally use standardized protocols as illustrated in FIG. 9B. In the example illustrated in FIG. 9B, the generic PHY and layer 2 (L2) protocol entities are shown for communication between the Serving GW 920 and PDN GW 922. The Network layer and the Transport layers may use IP and UDP as shown in FIG. 9B.

In the scenario of FIG. 8 where the client device CD2 804 may be running an active application App2 812 and the client device CD1 802 and client device CD3 806 may not be running any active applications, the client device CD2 804 may benefit by using the internet service that is available but not used by the client devices CD1 802 and CD3 806. According to an aspect of the present disclosure, the client devices may include a processing block referred to as Client Application Gateway (CAGW) that may enable the client devices to coordinate the data packet transfer with the other client devices and the WWAN such that data packets intended for one client device may be sent and received over multiple client devices and eventually delivered to the intended client device by other client devices over SRWL such as WLAN.

Figure 10:
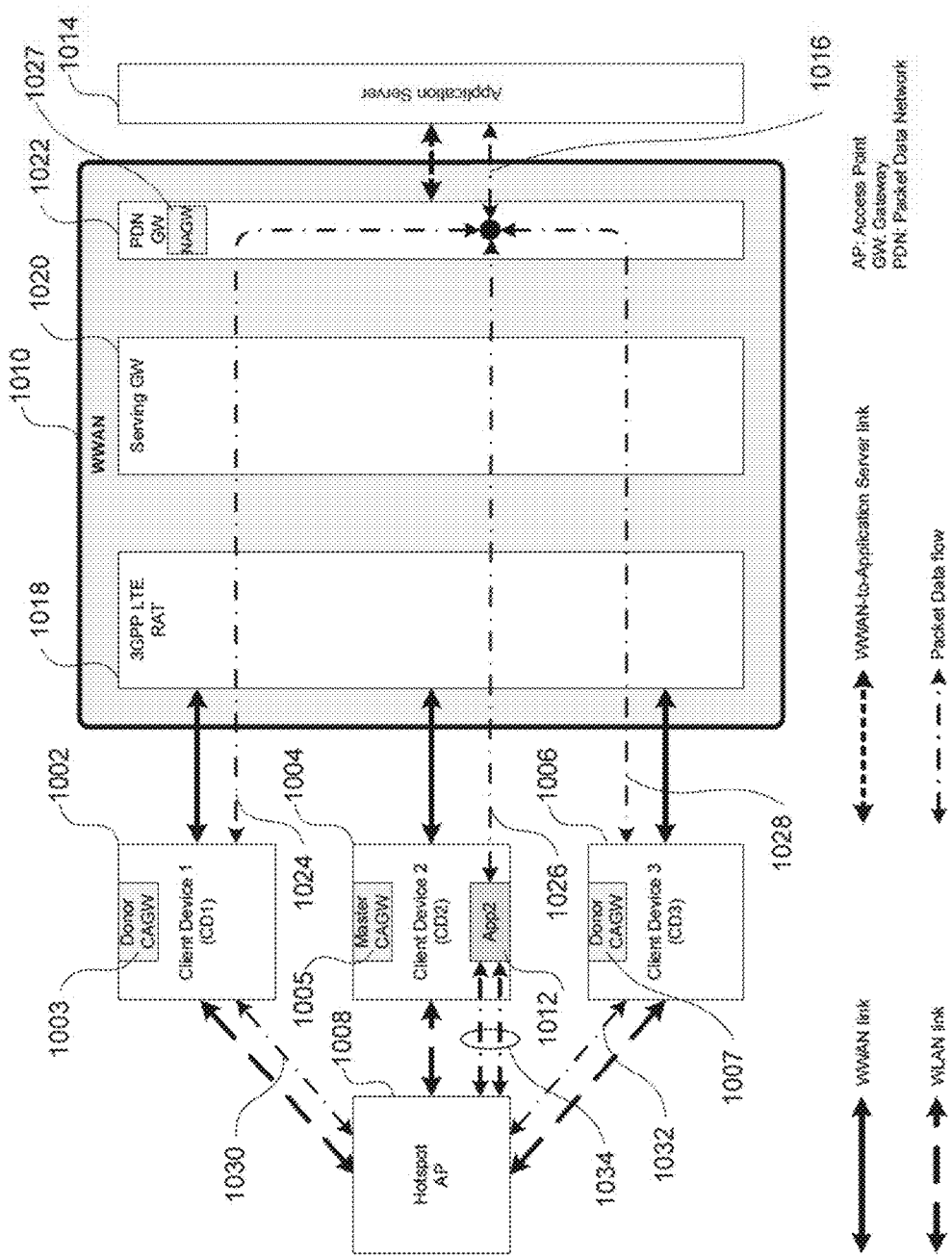
FIG. 10 illustrates a use case of multiple client devices capable of MB connection over the same WWAN with the same Radio Access Technology (RAT) and a WLAN with only one client application requiring internet service which is provided by its own client device and also by other client devices by sharing it over WLAN according to the aspects of the present disclosure.

FIG. 10 illustrates an example data packet flow where the CAGW 1003, CAGW 1005 and CAGW 1007 in three respective client devices CD1 1002, CD2 1004, and CD3 1006 have coordinated data packet transfer with the WWAN 1010 and amongst the three client devices through the Hotspot AP 1008. In this example scenario, the client device CD2 1004 is the only client device that is running an application App2 1012 that has an active internet connection through the WWAN 1010 to the Application Server 1014. The WWAN 1010 includes the 3GPP LTE RAT 1018, the Serving GW 1020, and the PDN GW 1022. According to an aspect of the present disclosure, in this case, the processing block CAGW within one of the client devices may play the role of a Master CAGW and first initiates a coordination request through the Hotspot AP with the other client devices in the local area for Pooling and Distribution (PD) mode of internet service. The CAGW in the other client devices participating in the PD mode of operation may be referred to as Donor CAGW. A set of client devices participating in the PD mode of operation may be collectively referred to as a PD group. In the present example illustrated in FIG. 10, the CAGW 1005 in client device CD2 1004 plays the role of Master CAGW while the CAGW 1003 in client device CD1 1002 and the CAGW 1007 in client device CD3 1006 play the role of Donor CAGWs. In this case the client device CD2 with Master CAGW is the beneficiary. According to an aspect of the present disclosure, in the PD mode of operation, one or more client devices may pool the internet service from the same or multiple sources and then distribute the internet service to one or more client devices participating in the PD mode. According to an aspect of the present disclosure, as part of the coordination, the Master CAGW may exchange the required information including but not limited to Media Access Control (MAC) address, IP address, International Mobile Subscriber Identity (IMSI), International Mobile Equipment Identity (IMEI), DL bandwidth to be shared (full, partial, or none), actual DL bandwidth shared (if partial sharing), UL bandwidth to be shared (full, partial, or none), actual UL bandwidth shared (if partial sharing) etc. for each of the client device indicating to participate in the PD mode of operation. According to an aspect of the present disclosure, if a client device is participating in the PD mode of operation, it may share its internet service entirely or only partly to other client devices. According to an aspect of the present disclosure, if sharing the internet service only partly, the Donor CAGW in a client device may indicate the portion of its internet service it is prepared to share for the PD mode of operation. According to an aspect of the present disclosure, a client device may belong to more than one PD group at a time and may share part of its internet service to each PD group. For example, if a client device has subscribed to a WWAN internet service of maximum 10 Mbps for download and upload, the Donor CAGW in a client device may indicate to the Master CAGW of one PD group that it is may share up to 2 Mbps in download and 1 Mbps in upload and may share 1 Mbps in download and 2 Mbps in upload to Master CAGW of another PD group. Alternatively, a client device may indicate that it may share a certain percentage of the actual available internet service. For example, the Donor CAGW in a client device may indicate to the Master CAGW that it may share up to 20% of the internet service available to it. According to an aspect of the present disclosure, a client device may determine to share internet service only in download, only in upload, or both directions.

According to an aspect of the present disclosure, after the Master CAGW successfully concludes the coordination with the Donor CAGWs in other client devices, the Master CAGW may initiate the coordination with the WWAN. According to an aspect of the present disclosure, the WWAN may include a Network Application Gateway (NAGW) that may coordinate with the Donor CAGWs in the client devices. According to an aspect of the present disclosure, in one example, the NAGW may be located inside the PDN GW of the WWAN at the IP layer. According to an aspect of the present disclosure, depending on the specific use case, the location of the NAGW may be in other entities in the data packet flow path between client devices and Application Server. According to an aspect of the present disclosure, as part of the coordination, the Master CAGW may provide the relevant information including but not limited to the MAC addresses, IP addresses, IMSI, DL bandwidth to be shared (full, partial, or none), actual DL bandwidth shared (if partial sharing), UL bandwidth to be shared (full, partial, or none), actual UL bandwidth shared (if partial sharing) etc. of the client devices that have agreed to participate in the PD mode of operation. According to an aspect of the present disclosure, the Master CAGW may also provide the indication of the portion of the internet service each Donor CAGW in a client device may share. Note that the addition of the CAGWs in the client devices and the NAGW in the WWAN is transparent to the Application Server and its operation may remain unaltered.

According to an aspect of the present disclosure, after the successful completion of coordination between the Master CAGW in the client device and the NAGW in the WWAN, the actual internet data packet transfer may begin. The Application Server may operate in the same way as before but may send/receive data packets at a higher data rate as it is now serving multiple client devices which eventually transfer all the data packets over to/from the Master CAGW over WLAN. According to an aspect of the present disclosure, the Application Server may always use the IP address of the client device with Master CAGW as the destination IP address in all the data packets it sends to the PDN GW. In the present example, the NAGW is located inside the IP layer of the PDN GW. According to an aspect of the present disclosure, the NAGW may make the determination of how the data packets should be routed to the different client devices depending on the previously agreed parameters during the coordination for sharing the internet service. For example, if the client device indicated that they will share their entire internet service to the Master CAGW, the NAGW in PDN GW may send the data packets to the different client devices on an equal basis in terms of the data rate. On the other hand, if the client devices indicated that they may share only a portion of their service, the NAGW in the PDN GW may send the data packets from the Application Server to the respective client devices according to their indicated preference for sharing. For example, the NAGW in the PDN GW may send 50% of the data packets to client device with Master CAGW, 30% to one client device with Donor CAGW and 20% to another device with Donor CAGW to meet the sharing preference indicated by the Master CAGW during coordination. According to an aspect of the present disclosure, the NAGW may create a dedicated PDN connection for each client device to route the IP data packets that belongs to a client device in which the Master CAGW may be located. For example, in FIG. 10 the NAGW may create a dedicated PDN connection, namely PDN1, to client device CD1 and a dedicated PDN connection, namely PDN3, to client device CD3 and a dedicated PDN connection, namely PDN2, to client device CD2. The NAGW may send the application data for Master CAGW in the PD group in the dedicated PDN connections PDN1, PDN2 and PDN3. The Donor CAGW in the client devices may route the IP data packets received in the dedicated PDN connection to the Master CAGW. According to an aspect of the present disclosure, the NAGW may use the dedicated PDN connection with each client devices PDN1, PDN2 and PDN3 to identify the IP data packet belonging to Master CAGW client device in the PD mode and may use the dedicated PDN connection to route the IP data packets from the Master CAGW client device to the application server. According to an aspect of the present disclosure, if the client device is registered to be part of more than one PD group then the NAGW may create more than one dedicated PDN connection for each client device, wherein each dedicated PDN connection may be utilized to send dedicated IP data packets to the Master CAGW of each PD group. This dedicated PDN connection between the client devices and the WWAN PDN GW may enable more than one application to run in the Master CAGW simultaneously and the IP data packets from all the application can be routed between the Master CAGW and NAGW through the dedicated PDN connection established with each of the client devices that are in PD mode of operation with the Master CAGW. Even though in FIG. 10 only one application App2 1012 is shown in the client device CD2 1004, there is no such restriction as such. Simultaneously many applications may be running in a client device when it is in PD mode of operation with other client devices.

The above aspects of the present disclosure are described further with the illustration in FIG. 10 as the reference. The data packet flow between the Application Server 1014 and the PDN GW 1022 is illustrated by 1016. The NAGW 1027 in the PDN GW 1022, as per the parameters of the coordination, splits/merges the data packet flows 1024, 1026, and 1028 proportionally to/from the three client devices CD1, CD2 and CD3 respectively. The data packet flow 1026 going to the client device CD2 1004 is handled by its CAGW 1005 and determines, based on the destination IP address in the TCP/IP layer, to directly serve its App2 1012. The data packet flow 1024 going to the client device CD1 1002 is received by its CAGW 1003 and it determines, based on the destination IP address, that the data packet needs to be forwarded to the client device CD2 1004 over the Hotspot AP 1008. It then initiates the data packet transfer with the client device CD2 1004 through the data packet flow 1030. Similarly, the data packet flow 1028 going to the client device CD3 1006 is received by its CAGW 1007 and it determines, based on the destination IP address, that the data packet needs to be forwarded to the client device CD2 1004 over the Hotspot AP 1008. It then initiates the data packet transfer with the client device CD2 1004 through the data packet flow 1032. Finally, the Hotspot AP 1008 delivers the data packets from the data packet flows 1030 and 1032 to the client device CD2 1004 over the data packet flow 1034. Similar processing takes place in the opposite direction when the application App2 1012 in client device CD2 1004 initiates data transfer towards the Application Server 1014.

Figure 11:
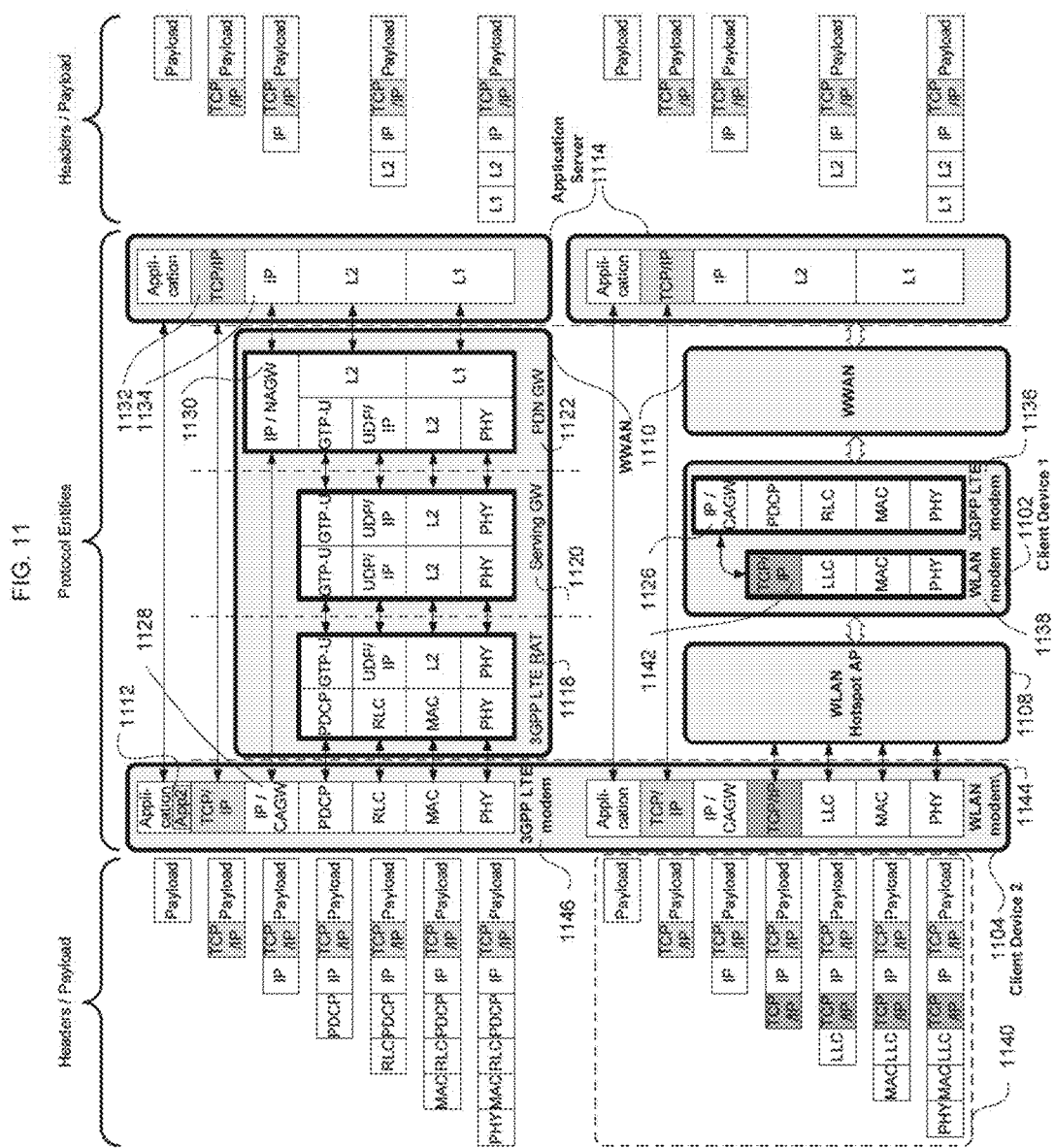
FIG. 11 illustrates the data packet flow and protocol entities involved in the use case of multiple client devices capable of MB connection over a WWAN and a WLAN with only one client application requiring internet service which is provided by its own client device and also by other client devices by sharing it over WLAN according to the aspects of the present disclosure.

FIG. 11 illustrates the entities and protocol layers involved in the entire data packet flow from Application Server 1114 to the App2 1112 in client device CD2 1104 directly and through the client device CD1 1102 and Hotspot AP 1108 according to the aspects of the present disclosure. The same processing may be carried out by other client devices such as CD3 participating in PD mode of operation. For clarity, PD mode operation with only two client devices, CD1 1102 and CD2 1104, is illustrated in FIG. 11. Note that the WWAN 1110 and Application Server 1114 shown in the upper half of FIG. 11 and the bottom half of FIG. 11 are the same entities, merely represented separately for illustrating the separate data packet flow for two different client devices. The WWAN 1110 includes the 3GPP LTE RAT 1118, Serving GW 1120, and the PDN GW 1122.

The new processing block CAGW, according to the aspects of the present disclosure, in the client devices operate in the IP layer as shown by processing block 1126 for client device CD1 1102 and processing block 1128 for client device CD2 1104 in FIG. 11. The new processing block NAGW, according to the aspects of the present disclosure, in the PDN GW 1122 operates at the IP protocol layer as shown by processing block 1130 in FIG. 11. The PDN GW 1122, equipped with the NAGW, sends different IP data packets to different client devices using the IP address of the respective client devices as the destination IP address in the header. The upper half of FIG. 11 is similar to the data packet flow illustrated in FIG. 9B for the case when only client device CD2 is involved in the data packet transfer. The bottom half of FIG. 11 shows the data transfer between the Application Server 1114 to the client device CD2 1104 via client device CD1 1102 over WLAN using Hotspot AP 1108. When the Application Server 1114 sends data packet with the destination IP address of client device CD2 1104, the NAGW at IP layer 1130 in the PDN GW 1122 determines that the data packet may be sent to the client device CD1 1102. Based on the parameters of the coordination, the NAGW at IP layer 1130 in the PDN GW 1122 prepares an IP header with the destination address of the client device CD1 1102 instead of the client device CD2 1104 that was sent by the Application Server 1114. Note that the destination IP address in the protocol entity TCP/IP 1132 is that of the client device CD2 1104. On the other hand, the IP address used in the IP layer 1134 in the Application Server 1114 is the IP address of the PDN GW 1122 to which it directly interfaces. The NAGW processing block in the IP protocol layer 1130 in the PDN GW 1122 may use the IP address contained in the TCP/IP layer 1132 header for making further decisions within the WWAN 1110 for routing the data packet to the either the client device CD1 1102 or the client device CD2 1104 depending on the parameters of the coordination.

In case the NAGW processing block in the IP protocol layer 1130 in the PDN GW 1122 determines that the data packet is to be routed to the client device CD2 1104, the data packet flow is the same as in FIG. 9B. In case the NAGW processing block in the IP protocol layer 1130 in the PDN GW 1122 determines that the data packet is to be routed to the client device CD1 1102, it uses the IP address of the client device CD1 1102 for the destination IP address to route it to the client device CD1 1102, in a manner similar to that for the client device CD2 1104. For the chosen example, when the 3GPP LTE modem 1136 of the client device CD1 1102 receives the data packet, the CAGW processing block at IP layer 1126 checks the destination IP address in the TCP/IP header inserted by the TCP/IP layer 1132. The CAGW at IP layer 1126 may determine that the data packet is intended for the client device CD2 1104 based on the CAGW coordination. At this time the CAGW at IP layer 1126 may prepare a data packet for transmission over the WLAN using its WLAN modem 1138. The data packet at this point may include the application payload and the TCP/IP header introduced at the TCP/IP layer 1132 in the Application Server 1114. The CAGW at IP layer 1126 in the client device CD1 1102 adds another TCP/IP header for transmission over the WLAN link and sends it to the client device CD2 1104 over the WLAN link through the Hotspot AP 1108 using the already available MAC address, IP address, etc. based on the parameters of the coordination. The data packet format illustration 1140 that may include headers from various layers and payloads, the two different TCP/IP headers are shown with different shading. The lighter grey TCP/IP header is the one introduced by the TCP/IP layer 1132 in the Application Server 1114. The darker grey TCP/IP header is the one introduced by the TCP/IP layer 1142 in the WLAN modem 1138 of the client device 1102. The WLAN modem 1144 in the client device CD2 1104 may receive the data packet sent by the WLAN modem 1138 of the client device CD1 1102 and the protocol entities of WLAN modem 1144 may remove the headers added by the peer protocols entities of WLAN modem 1138. At this point the client device CD2 1104 is left with the payload data and the TCP/IP header introduced at the TCP/IP layer 1132 of the application server 1114. The destination IP address in this TCP/IP layer header is for the client device CD2 1104. The TCP destination address and the port number in the TCP header of the TCP/IP layer may identify the specific application for which the data packet is intended. In the present example, the data packet is for the App2 1112 in the client device CD2 1104. Thus, the App2 1112 receives data packets from both the internet service from 3GPP LTE RAT using 3GPP LTE modem 1146 of client device CD2 1104 and the internet service from 3GPP LTE RAT using 3GPP LTE modem 1136 of client device CD1 1102 by getting the data packets forwarded from the client device CD1 1102 to client device CD2 1104 over WLAN through the Hotspot AP 1108. In the present example, the CAGW in the client device CD2 1104 pays the role of Master CAGW and the CAGW in the client device CD1 1102 plays the role of Donor CAGW.

According to an aspect of the present disclosure, the NAGW in the PDN GW 1122, may perform re-order operations at the IP layer on the application level data packets in upload directions. According to an aspect of the present disclosure, the Master CAGW in the client device may perform the re-order operations at the IP layer on the application level data packets in both download directions. According to an aspect of the present disclosure, the NAGW in the PDN GW 1122 may maintain a timer to discard the out of order IP data packets which may be pending to be received to re-order the IP layer data packets in the upload direction. The timer value may be derived based on experiments and/or simulation and it may be in the order of few 100 ms. According to an aspect of the present disclosure, the Master CAGW in the client device may maintain a timer to discard the out of order IP data packets which may be pending to be received to re-order the IP data packets in the download direction. The timer value may be derived based on experiments and/or simulation and it may be in the order of few 100 ms.

According to an aspect of the present disclosure, the acknowledgement data packets for the application data packets at the Transport layer may be sent by the client device with Master CAGW alone. According to an aspect of the present disclosure, in another embodiment, acknowledgement data packets for the application data packets at the Transport layer may be sent by the client devices with both Master and Donor CAGWs.

Figure 18:
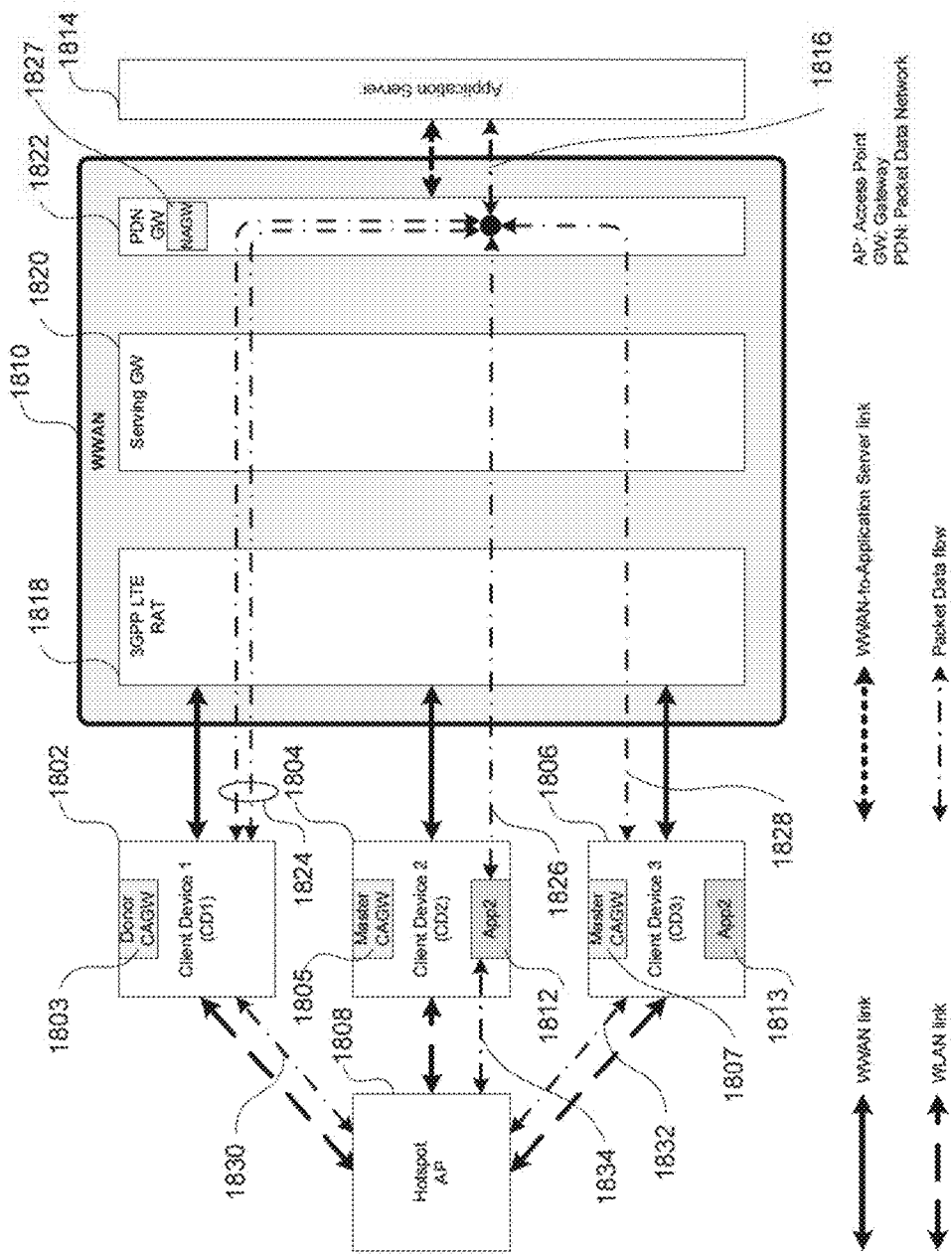
FIG. 18 illustrates a use case of multiple client devices capable of MB connection over the same WWAN with the same Radio Access Technology (RAT) and a WLAN with two applications in two different client devices requiring internet service which is provided by their own client devices and also by another client device by sharing it over WLAN according to the aspects of the present disclosure.

According to an aspect of the present disclosure, there may be multiple Master CAGWs among a set of client devices connected to a common SRWL such as WLAN. For example, in case of three client devices CD1, CD2, and CD3, the client device CD2 and client device CD3 may be running active applications App2 and App3 respectively and may initiate a coordination request for PD mode of operation. The client device CD1 may accept the request for PD mode operation for both the client devices CD2 and CD3. The client devices CD2 may decline to participate in the PD mode operation request of client device CD3 and vice versa. With this coordination, the data packets received by CAGW in client device CD1 from the WWAN and addressed to the client device CD2, may send those data packets to client device CD2 over WLAN. Similarly, the data packets received by CAGW in client device CD1 from the WWAN and addressed to the client device CD3, may send those data packets to client device CD3 over WLAN. Similar processing flow applies for the data packet flow in reverse direction, i.e., from client devices to the Application Server. In this example, the client device CD1 plays the role of Donor CAGW whereas the client devices CD2 and CD3 play the role of Master CAGW. According to an aspect of the present disclosure, the Donor CAGW may dynamically re-coordinate the portion of the internet service it is prepared to share with each of the Master CAGW client devices. This mode of operation with multiple Master CAGWs is illustrated in FIG. 18 where the client devices CD2 1804 and CD3 1806 playing the roles of Master CAGW. In the present example, there are two PD groups: one PD group comprising client device CD2 1804 (Master CAGW) and client device CD1 1802 (Donor CAGW) and the second PD group comprising client device CD3 1806 (Master CAGW) and client device CD1 1802 (Donor CAGW). The client device CD1 1802 may maintain two separate PDN connections 1824 with the PDN GW 1822 and the NAGW 1827; one for PD mode of operation with the Master CAGW 1805 in the client device CD2 1804 and another for PD mode of operation with the Master CAGW 1807 in the client device CD3 1806.

According to an aspect of the present disclosure, the Master CAGW may perform additional supervisory tasks as part of the coordination in the PD mode of operation. According to an aspect of the present disclosure, the Master CAGW may request and keep track of the status of the various communication links involved in the PD mode of operation. For example, the Master CAGW may request and keep track of the Received Signal Strength Indicator (RSSI) and Received Signal Quality (RSQ) of both the WLAN and 3GPP LTE modems of the client devices with Donor CAGW that are participating in the PD mode of operation. Master CAGW may also keep track of the data rate of both WLAN and 3GPP LTE modems of each of the client device participating in the PD mode of operation. According to an aspect of the present disclosure, the Master CAGW may use the current link status of the client devices participating in the PD mode to determine which upload IP data packets may be scheduled through which client device for better QoS. For example, if a real time application IP data packets are to be sent to the application server through the NAGW, the Master CAGW may choose a wired network client device in the PD mode or a client device with better link status to schedule the real time application IP data packets. According to an aspect of the present disclosure, if the communication link status degrades below a certain level, e.g., RSSI, RSQ or the data rates or a combination of these parameters fall below certain configurable thresholds, the Master CAGW may initiate a procedure to remove the participating client device from the PD mode of operation. The configurable thresholds may be determined based on simulations and/or field testing. The example value for the thresholds may be dependent on the particular technology being used for the internet service. For example, the RSSI threshold may be set in relation to the sensitivity requirement for a given technology. As an example, the threshold for RSSI may be set to 1 dB above the sensitivity level (−94 dBm) for 3GPP LTE RAT Band 13. The exact values may be used based on the specific technology being used at any given time.

According to another aspect of the present disclosure, the Master CAGW may periodically send a broadcast request to look for other client devices that may be present on the SRWL to which it may be currently connected. According to another aspect of the present disclosure, upon detecting new client devices present on the SRWL, the Master CAGW may periodically send a broadcast request to look for client devices that may be willing to participate into an ongoing PD mode of operation. According to another aspect of the present disclosure, if new client devices are willing to participate in the PD mode of operation, the Master CAGW may perform the coordination with the client devices first and then initiate coordination with the NAGW in the WWAN to add the new client devices to the ongoing PD mode of operation. The periodic broadcast request for new client willing to participate in PD mode of operation may include client devices that may have previously rejected the request for participation in PD mode of operation. According to an aspect of the present disclosure, a client device may include a user interface for configuring various aspects and parameters of the PD mode of operation including enabling and disabling of the entire capability. According to an aspect of the present disclosure, when a client device receives a request for entering PD mode of operation, the user may be presented with the information about the client device sending the request for PD mode of operation. According to an aspect of the present disclosure, when a client device receives a request for entering PD mode of operation, the user of the client device may be prompted for allowing or disallowing the PD mode of operation in that specific instance even when the PD mode of operation may be generally enabled. Furthermore, according to an aspect of the present disclosure, the use may allow the client device to enter PD mode of operation under certain conditions such as only for a specified duration, e.g., for the next one hour from the moment the PD mode request is received. According to an aspect of the present disclosure, the user may configure the percentage of the internet service to be shared in the uplink and downlink with each client device requesting PD mode of operation. According to an aspect of the present disclosure, the client device may provide an interface for the user to be able to enter or exit the PD mode of operation. According to an aspect of the present disclosure, the PD mode of operation and its various parameters such as percentage of internet service to be shared maybe dynamically adapted based on various conditions. For example, in case of battery operated client devices, it may enter PD mode of operation only when the remaining charge in the client device is above a certain level, e.g., 40% or more. In another example, a client device may enter PD mode of operation only over certain SRLs, e.g., only in home WLAN or WLANs that have security enabled. According to an aspect of the present disclosure, the client device may provide a user interface for limiting the maximum number of client devices with which it may enter PD mode of operation. For example, a client device may be configured to enter PD mode of operation with only one other client device (with Master CAGW) at a time.

A client device that may be part of the PD mode of operation may abruptly lose coverage of either the WLAN or WWAN, or both. According to an aspect of the present disclosure, the Master CAGW may maintain timers for keeping track of active data transfer links with the Donor CAGW. According to an aspect of the present disclosure, the Master CAGW may remove a Donor CAGW if it becomes unresponsive over a period of configurable time, for example, 10 seconds. The Master CAGW may refresh the timer for each Donor CAGW every time it sends or receives a data packet successfully through each of the Donor CAGWs. According to an aspect of the present disclosure, the Donor CAGW may maintain a timer for keeping track of active data transfer link with the Master CAGW. According to an aspect of the present disclosure, a Donor CAGW may terminate PD mode of operation with a Master CAGW if it becomes unresponsive over a period of configurable time, for example, 10 seconds. According to an aspect of the present disclosure, the NAGW may terminate PD mode of operation with a Donor CAGW if it becomes unresponsive over a period of configurable time, for example, 10 seconds. According to an aspect of the present disclosure, when a PD mode of operation with a Donor CAGW is terminated by the NAGW, the NAGW informs the Master CAGW about the removal of the particular CAGW from the PD group. According to an aspect of the present disclosure, the NAGW may terminate PD mode of operation with a Master CAGW and all the Donor CAGWs in a PD group if the Master CAGW becomes unresponsive over a period of configurable time, for example, 10 seconds.

A client device with a Donor CAGW, which at some point may not be running any active application may later start running an application which may require internet service. According to another aspect of the present disclosure, a Donor CAGW in client devices may at any point indicate to the Master CAGW that it no longer willing to continue to participate in the PD mode of operation. According to another aspect of the present disclosure, upon receiving such a request, the Master CAGW may communicate with the NAGW in the WWAN to remove one or more client devices from the ongoing PD mode of operation. According to another aspect of the present disclosure, the Donor CAGW in a client device may send a message to the Master CAGW to indicate that it needs to renegotiate the parameters of the coordination for the PD mode of operation. For example, the Donor CAGW may determine to allocate some portion of its internet service for its own application while sharing the remaining portion with the Master CAGW.

According to an aspect of the present disclosure, whenever there is change in the parameters of coordination including the addition or removal of client device from PD mode of operation, the Master CAGW may inform the NAGW on the network side in the PDN GW about the updated parameters of the coordination parameters including addition or removal of any client devices.

According to an aspect of the present disclosure, PD mode of operation may be enabled by the CAGW in the client devices and the NAGW in the PDN GW of the WWAN which may use a 3GPP UMTS RAT, EVDO RAT, GSM RAT, CDMA RAT or any other RAT for internet service.

Figure 12:
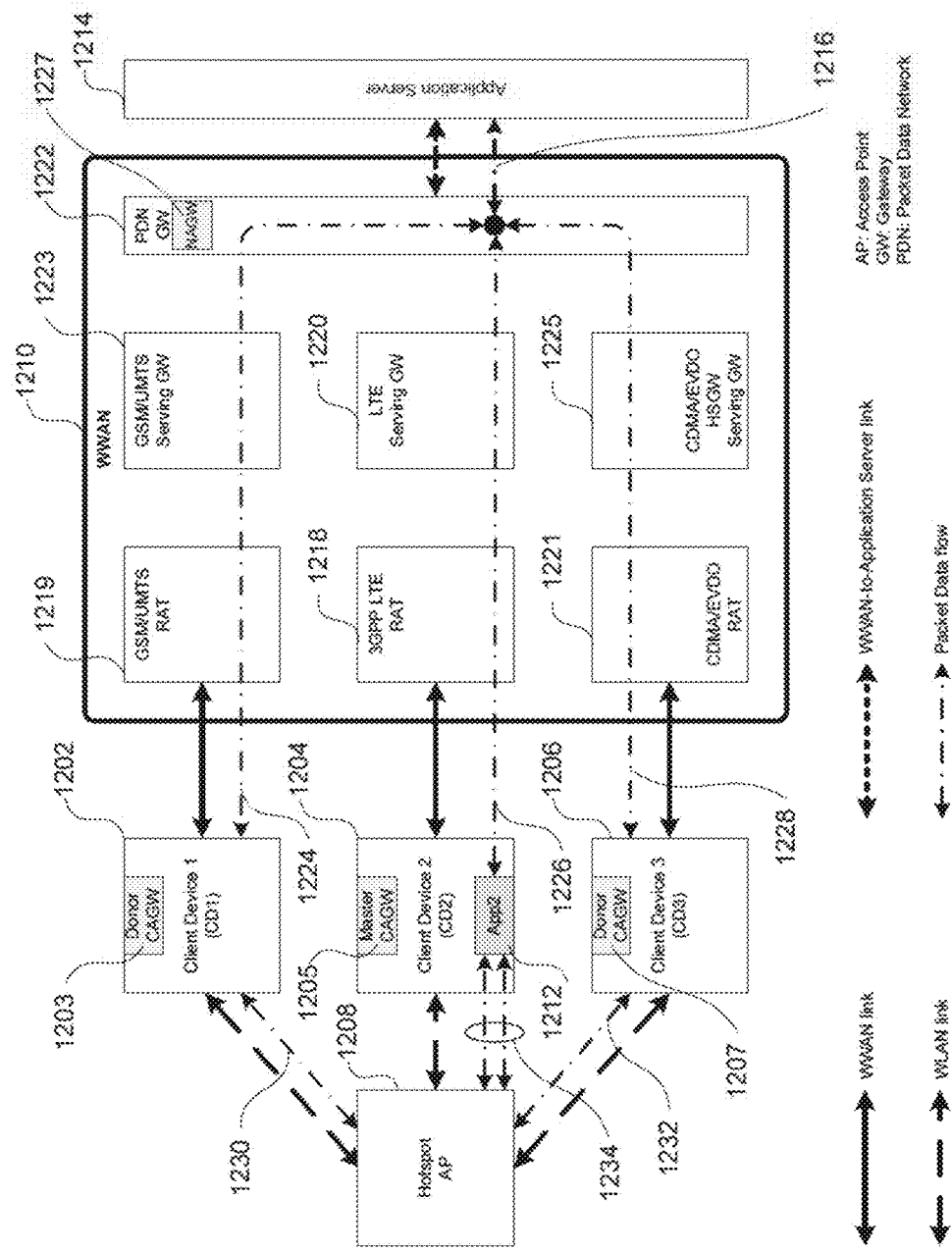
FIG. 12 illustrates a use case of multiple client devices capable of MB connection over the same WWAN with different RATs and a WLAN with only one client application requiring internet service which is provided by its own client device and also by other client device by sharing it over WLAN according to the aspects of the present disclosure.

According to an aspect of the present disclosure, PD mode of operation may enabled by the CAGWs in the client devices and NAGW in the PDN GW of a WWAN which may use two or more RATs simultaneously for internet service. For example, some client devices that are not capable of 3GPP LTE RAT may get internet service using 3GPP UMTS RAT or EVDO RAT. Similarly, some client devices that are not capable of 3GPP LTE RAT, 3GPP UMTS RAT or EVDO RAT, may get internet service using GSM RAT or CDMA RAT. A use case is illustrated in FIG. 12 with three different client devices connected to three different RATs of the same WWAN. Many elements and data packet data flow is similar to the use case illustrated in FIG. 10 but with some important differences. The client device CD1 1202 is now connected to the WWAN through the GSM/UMTS RAT 1219 which in turn is connected to its own GSM/UMTS Serving GW 1223. The client device CD3 1206 is now connected to the WWAN through the CDMA/EVDO RAT 1221 which in turn is connected to its own CDMA/EVDO Serving GW 1225. As in the case of FIG. 10, the client device CD2 1204 is connected to the WWAN through the LTE RAT 1218 which in turn is connected to its own LTE Serving GW 1220. All three Serving GWs are connected to the single PDN GW 1222 with a single NAGW 1227 which in turn connects to the Application Server 1214.

According to an aspect of the present disclosure, the client devices may use a different SRWL and SRCL such as Bluetooth, Zigbee, Ethernet, USB, etc. instead of WLAN for local connectivity.

Figure 13:
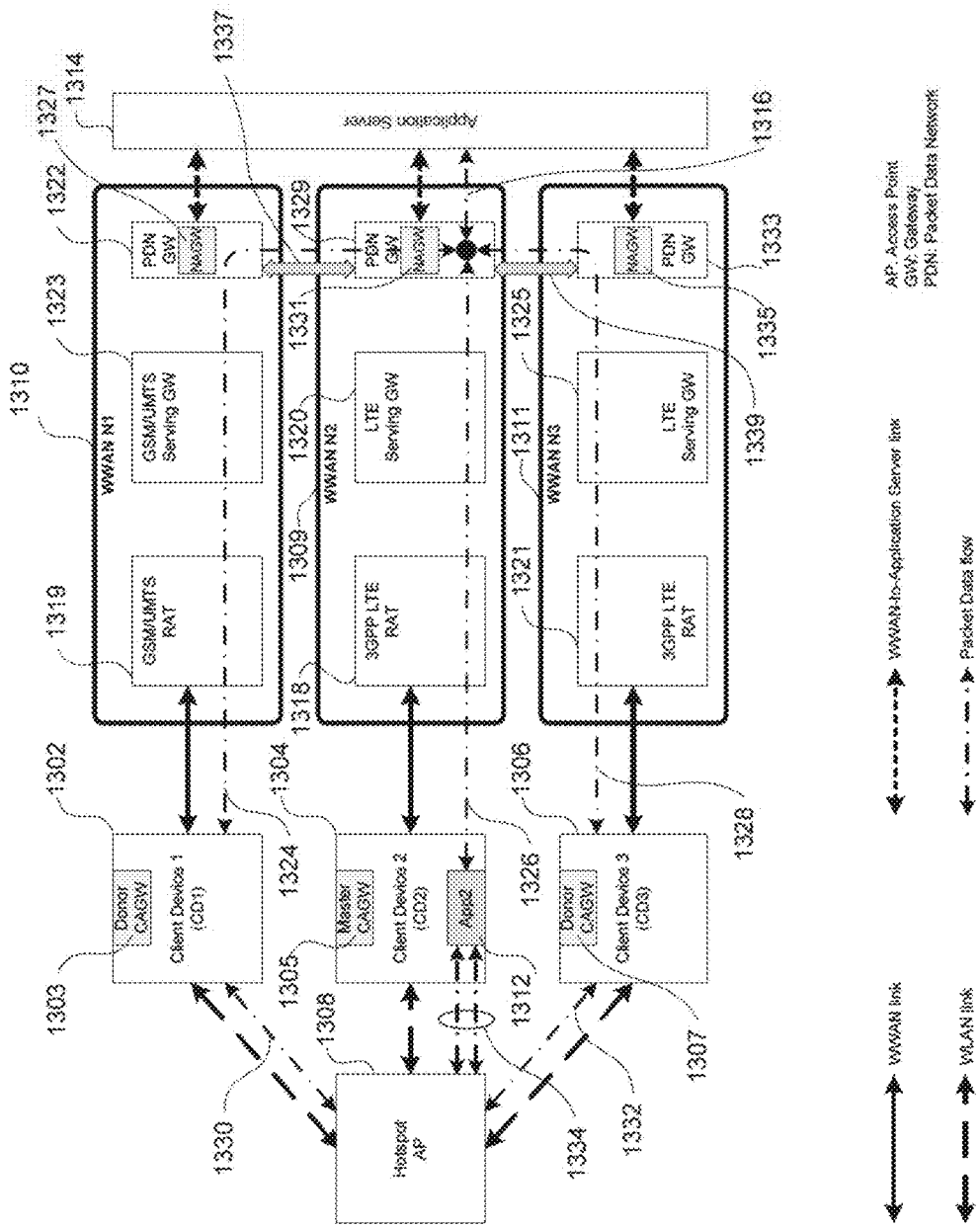
FIG. 13 illustrates a use case of multiple client devices capable of MB connection over different WWANs with the same or different RATs and a WLAN with only one client application requiring internet service which is provided by its own client device and also by other client devices by sharing it over WLAN according to the aspects of the present disclosure.

According to another aspect of the present disclosure, the client devices in a given WLAN may be connected to different WWAN with the same or different type of RAT while operating in PD mode of operation as illustrated in FIG. 13 for an example case. In this example, the client device CD1 1302 is connected to the Application Server 1314 through the WWAN N1 1310 which uses the GSM and UMTS RAT 1319. The client device CD2 1304 is connected to the Application Server 1314 through the WWAN N2 1309 which uses the LTE RAT 1318. The client device CD3 1306 is connected to the Application Server 1314 through the WWAN N3 1311 which uses the LTE RAT 1321. The PDN GW in each WWAN provides the interface with other packet data networks (PDNs). In the present example, the PDN GW 1322 in the WWAN N1 1310 uses interface 1337 with the PDN GW 1329 of WWAN N2 1309. Similarly, the PDN GW 1329 in the WWAN N2 1309 uses interface 1339 with the PDN GW 1333 of WWAN N3 1311. The communication between PDN GW of different PDNs may use a standardized interface. Each PDN GW in each WWAN may include its own NAGW. Specifically, the PDN GW 1322 may include the NAGW 1327, the PDN GW 1329 may include the NAGW 1331, and the PDN GW 1333 may include the NAGW 1335. According to an aspect of the present disclosure, the Master CAGW 1305 in the client device CD2 may perform the coordination for PD mode of operation with the other client devices on the same SRL (e.g., WLAN, LAN) in a similar manner as described for the use case in FIG. 10. The Master CAGW may request additional information about the PDN GW being used by each of the client device willing to participate in the PD mode of operation. The Master CAGW 1305 may provide the PDN GW information for each client device along with their MAC address, IP address, and other relevant information to the NAGW 1331 in the PDN GW 1329 of its own WWAN N2 1309. According to an aspect of the present disclosure, the NAGW 1331 in the PDN GW 1329 of WWAN N2 1309 communicates with its peer NAGW 1327 in the PDN GW 1322 of WWAN N1 1310 and with the NAGW 1335 in the PDN GW 1333 of WWAN N3 1311 to establish the PD mode of operation according to the parameters of the coordination.

After the coordination for PD mode of operation is established, the data packet flow between the client device CD2 1304 and the Application Server 1314 may begin. All the data packets from Application Server 1314 are routed to the PDN GW 1329 of the WWAN N2 1309 as it corresponds to the WWAN of the client device CD2 1304 with Master CAGW 1305. Next the NAGW 1331 in PDN GW 1329 performs the routing of the data packets to the peer PDN GWs in the WWAN N1 and WWAN N3. The data packets traverse through three different WWANs using different RATs and eventually reach the client devices. Next the client devices CD1 1302 and CD3 1306, using the SRL (e.g., WLAN, LAN), forward the data packets intended for the client device CD2 1304 to it. The data packet flow 1316 illustrates this transfer of data packets through the WWANs. The data packet flows 1330, 1332 and 1334 illustrate the transfer of data packet through the SRL (e.g., WLAN, LAN).

Figure 14:
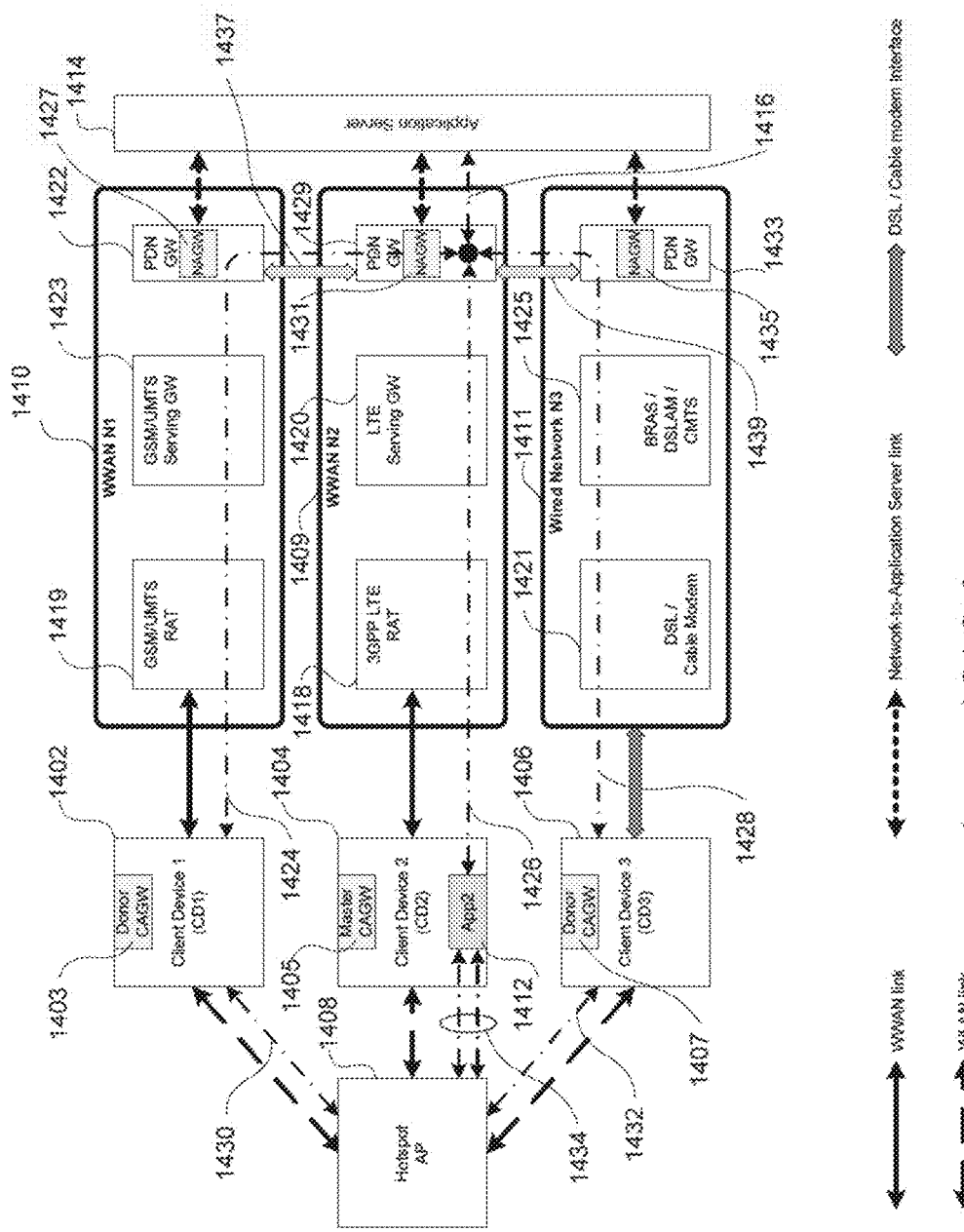
FIG. 14 illustrates a use case of multiple client devices capable of MB connection over different WWANs with the same or different RATs, a wire-line network (Digital Subscriber Line (DSL)/Cable Modem) and a WLAN with only one client application requiring internet service which is provided by its own client device and also by other client devices by sharing it over WLAN according to the aspects of the present disclosure.

The example case illustrated in FIG. 13 uses different WWANs with the same or different RATs. Even though in FIG. 13 each WWAN has its own PDN GW, in certain network configurations the same PDN GW may connect to different WWAN networks. For example, WWAN N1 and WWAN N2 shown in FIG. 13 may be connected to the same PDN GW. According to an aspect of the present disclosure, the PD mode of operation may be enabled when one or more of the client devices obtain internet service over a different type of network such as wire-line networks such as DSL, DOCSIS, Ethernet, fiber, etc and/or satellite communication networks, while other client devices may be obtaining internet service over WWANs. An example of this use case is illustrated in FIG. 14 where the client devices CD1 1402 and CD2 1404 obtain internet service over WWANs (as explained for the example illustration in FIG. 13) but the client device CD3 1406 obtains internet service over a wired network such as DSL or Cable Modem. Specifically, client device CD3 1406 may obtain internet service by connecting to the Wired Network N3 1411 which includes the DSL/Cable Modem 1421, the Digital Subscriber Line Access Multiplexer (DSLAM)/Broadband Remote Access Server (BRAS)/Cable Modem Termination System (CMTS) 1425, and the PDN GW 1433. According to an aspect of the present disclosure, the functional operation of the CAGWs in the client devices and the NAGWs in the PDN GWs may remain essentially the same. The primary difference between the examples illustrated in FIG. 13 and FIG. 14 is in the underlying mechanisms for transporting data packets from the PDN GW to the client device.

Figure 15:
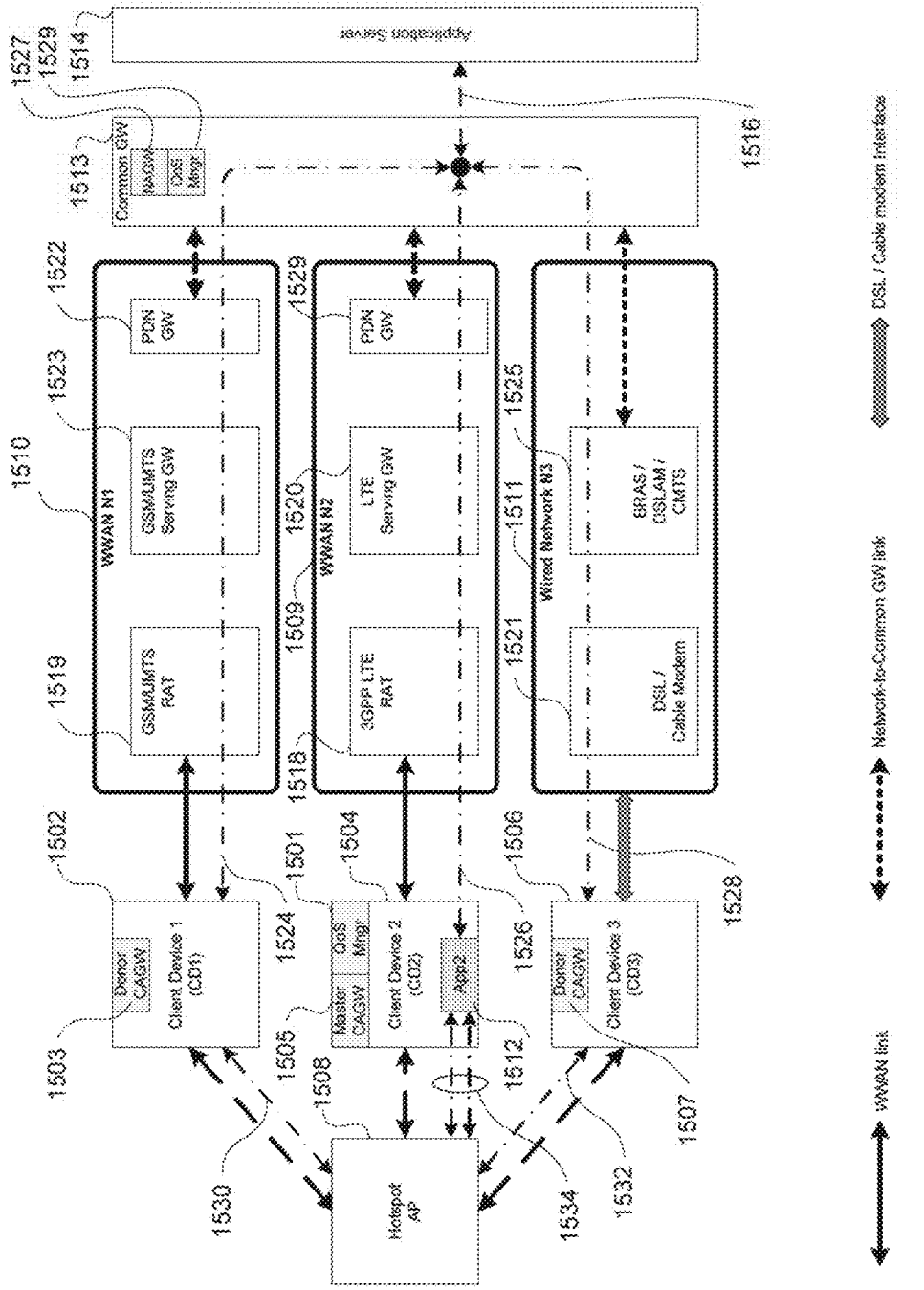
FIG. 15 illustrates a use case of multiple client devices capable of MB connection over different WWANs with the same or different RATs, a wire-line network (DSL/Cable Modem) and a WLAN with only one client application requiring internet service which is provided by its own client device and also by other client devices by sharing it over WLAN and providing QoS management according to the aspects of the present disclosure.

According to an aspect of the present disclosure, a new gateway element called Common GW may be used for coordinating the PD mode of operation on the network side when multiple network operators are involved and using different RATs as well as DSL/Cable Modem and satellite communication networks. An example use of the new Common GW is illustrated in FIG. 15 for the same scenario as illustrated in FIG. 14 for the case of two client devices CD1 1502 and CD2 1504 connected to Application Server 1514 over WWANs 1510 and 1509 respectively and the client device CD3 1506 connected to Application Server 1514 over DSL/Cable Mode Wired Network N3 1511. The BRAS/DSLAM/CMTS 1525 network element connects directly to the new Common GW 1513 which in turn connects to the Application Server 1514. According to an aspect of the present disclosure, the NAGW 1527 may be located inside the new Common GW 1513. According to an aspect of the present disclosure, the NAGW inside the Common GW may perform the coordination with the Master CAGW in the Client Device CD2 1504. The introduction of the new Common GW may avoid the need for having the NAGW in the PDN GW of each network over which the client device may connect. According to an aspect of the present disclosure, the PD mode of operation may further include Quality-of-Service (QoS) capability to effectively meet the requirements such as data rate, latency, error rate, priority, etc. for each of the applications in each of the client devices participating in the PD mode of operation. According to an aspect of the present disclosure, each of the client devices participating in the PD mode of operation may play the role of a QoS Manager. According to an aspect of the present disclosure, the processing block that performs QoS Manager functions may be located inside the CAGW of each client device. The QoS Manager may perform its functions of providing required data rate, latency, error rate, priority, etc. for each client device in which it may be executing. The QoS Manager processing block in the CAGW may locally distribute the internet service to the client devices participating in the PD mode of operation and are receiving internet service from other client devices with Donor CAGW. According to an aspect of the present disclosure, when performing coordination for PD mode of operation, the QoS Manager in the Master CAGW may negotiate the QoS parameters (data rate, latency, jitter, error rate, priority, etc.) with all the QoS Manager in the client devices with Donor CAGWs willing to participate in the PD mode of operation. After the coordination is completed and the data packet transfer is started, the QoS manager in each client device actively manages the available internet service and distributes it according to the agreed QoS parameters during coordination. For example, while one client device is engaged in voice or video call over internet, another client device may be performing file download. In this case, the QoS Manager may give higher priority to the client device running the delay-sensitive application (voice or video call over internet) over the delay-tolerant application (file download) while still maintaining service level for it such as minimum average data rate.

According to an aspect of the present disclosure, there may be a QoS Manager processing block in one of the network elements for managing the different QoS requirements of different client devices and their respective different applications. The QoS Manager in the Master CAGW may negotiate the QoS parameters during the coordination for PD mode of operation. After completing the coordination with other client devices, the Master CAGW may initiate coordination with the NAGW on the network side which may include providing the QoS parameters already negotiated by the Master CAGW with the other client devices participating in the PD mode of operation. According to an aspect of the present disclosure, the NAGW which may include a QoS Manager processing block, may use the coordination parameters, communicated by the Master CAGW, for performing the actual QoS related functions such as prioritization, data rate allocation, latency, etc. The QoS Manager 1501 is located inside the client device CD2 as illustrated in FIG. 15. On the network side, the QoS Manager 1529 and NAGW 1527 are located inside the Common GW 1513.

According to another aspect of the present disclosure, the CAGW and the NAGW may enhance the QoS capability by introducing a header with sequence numbers on the application level data packets. According to another aspect of the present disclosure, the sending entity (CAGW or NAGW) may insert a header with sequence number in each application data packet and the receiving entity (NAGW or CAGW) may use the sequence number in the header for re-ordering the application data packets for better QoS handling. The reordering may be especially critical for scenarios involving multiple WWAN or wired networks. According to an aspect of the present disclosure, the NAGW may schedule the data packets of an application such as a voice or video call with real time QoS requirements, through client devices that have low data packet loss and low delay, for example, client device connected to a wired network. According to an aspect of the present disclosure, the NAGW may monitor the current link status of each client device in the PD mode and may use the current link status to determine which IP data packet to be scheduled through which client device. For example, the NAGW may use the client device with better link status to schedule the real time application data packets for better QoS.

According to an aspect of the present disclosure, the Master CAGW and the NAGW may exchange periodic QoS feedback notification about the active applications that may be running in the Master CAGW client device. This may help both the Master CAGW and the NAGW for better QoS maintenance of the applications in a dynamic manner. For example, the Master CAGW may take feedback from applications running in client devices locally about the data packet flows, data packets scheduled versus successfully received through each client device for both download and upload. The Master CAGW and the NAGW may provide the QoS information to each other and thereby NAGW may perform better QoS management of downlink data packets scheduling. According to an aspect of the present disclosure, the NAGW may get the data packets scheduled versus successfully transmitted data packets statistics from the WWAN and/or other network entities involved in data packet transfer and may track those metrics to determine the QoS of the download IP data packets scheduling across different client devices in the PD mode. According to an aspect of the present disclosure, the Master CAGW may get the data packets scheduled versus successfully transmitted data packets statistics from other client devices in the PD mode and may track those metrics to determine the QoS of the upload IP data packets scheduling across different client devices in the PD mode.

According to an aspect of the present disclosure, when the Master CAGW sends the coordination request to NAGW, the NAGW may reject the coordination request. According to an aspect of the present disclosure, when the Master CAGW sends the coordination request to NAGW, the NAGW may respond with acceptance to add all client devices listed in the PD mode coordination request. According to an aspect of the present disclosure, when the Master CAGW sends the coordination request to NAGW, the NAGW may respond with acceptance of one or more of the client devices listed in the PD mode coordination request and may reject some client devices in the list sent in the PD mode coordination request. According to an aspect of the present disclosure, when the NAGW responds to the Master CAGW, the NAGW may revise the internet service sharing rate for each client devices based on the network allowed internet service sharing rate for each client.

Some of the PD mode client devices may be wireless client devices and may be battery operated. After the Master CAGW and NAGW coordination is completed, one or more client devices in the PD mode may get disconnected from NAGW or may have to switch to a different PDN GW. Many other such scenarios are possible due to mobility, wireless link degradation, or battery operated nature of some client devices. According to an aspect of the present disclosure, when the client device in PD mode is changing its connection to another PDN GW because of handover or cell change procedure, the NAGW may remove the client device from PD mode list and may send remove notification to the Master CAGW. According to another aspect of the present disclosure, when the client device in PD mode is changing its connection to another PDN GW because of handover or cell change procedure, the NAGW may continue to keep the client device in PD mode list and may send continue notification to the Master CAGW with any change in the internet service sharing parameters of the client device.

According to an aspect of the present disclosure, the client device in the PD mode may notify the Master CAGW if there is any change in WWAN connection for the client device which may change its internet service sharing capability or parameters. The Master CAGW may at that point determine to remove the client device from PD mode and may perform re-coordination with the NAGW. According to an aspect of the present disclosure, if a client device with Donor CAGW determines to leave the PD mode with a Master CAGW, the client device with Donor CAGW may send all the currently received IP data packets in its buffer to the Master CAGW regardless of whether the buffered IP data packets are in ordered sequence or not.

When the NAGW schedules an IP data packet to the client device by routing the IP data packet to the respective WWAN or other network elements, the IP data packets may not be immediately sent to the client devices. Even after the IP data packets are sent to the client devices, they may get lost during the transmission as some of the client devices may be connected to the network by a wireless connection. According to an aspect of the present disclosure, the NAGW may keep track of the IP data packet sequence numbers which are received and acknowledged by each client device through their respective WWAN connection. According to an aspect of the present disclosure, when the NAGW removes a client device with a Donor CAGW from PD mode or when the NAGW detects that a client device with the Donor CAGW is getting disconnected from network, the NAGW may resend all the IP data packets pending in the WWAN network, that were to be scheduled to the client device with Donor CAGW or not acknowledged by the client device with Donor CAGW, through other client devices with Donor CAGW or directly to the Master CAGW.

According to an aspect of the present disclosure, the Master CAGW may keep track of the upload IP data packets sequence numbers that are sent through each client device in PD mode with Master CAGW. According to an aspect of the present disclosure when a client device is being removed from PD mode or getting disconnected from the WWAN or other IP service network, the client device may send all the pending upload IP data packets that are yet to be sent to the NAGW, back to the Master CAGW. According to an aspect of the present disclosure when a client device is being removed from PD mode or getting disconnected from the WWAN or other IP service network, the client device may notify the Master CAGW about the IP data packet sequence number up to which the IP data packets were successfully sent to the NAGW. This may allow the Master CAGW to schedule the pending IP data packets of the removed client device through other client devices in the same PD group.

Figure 16:
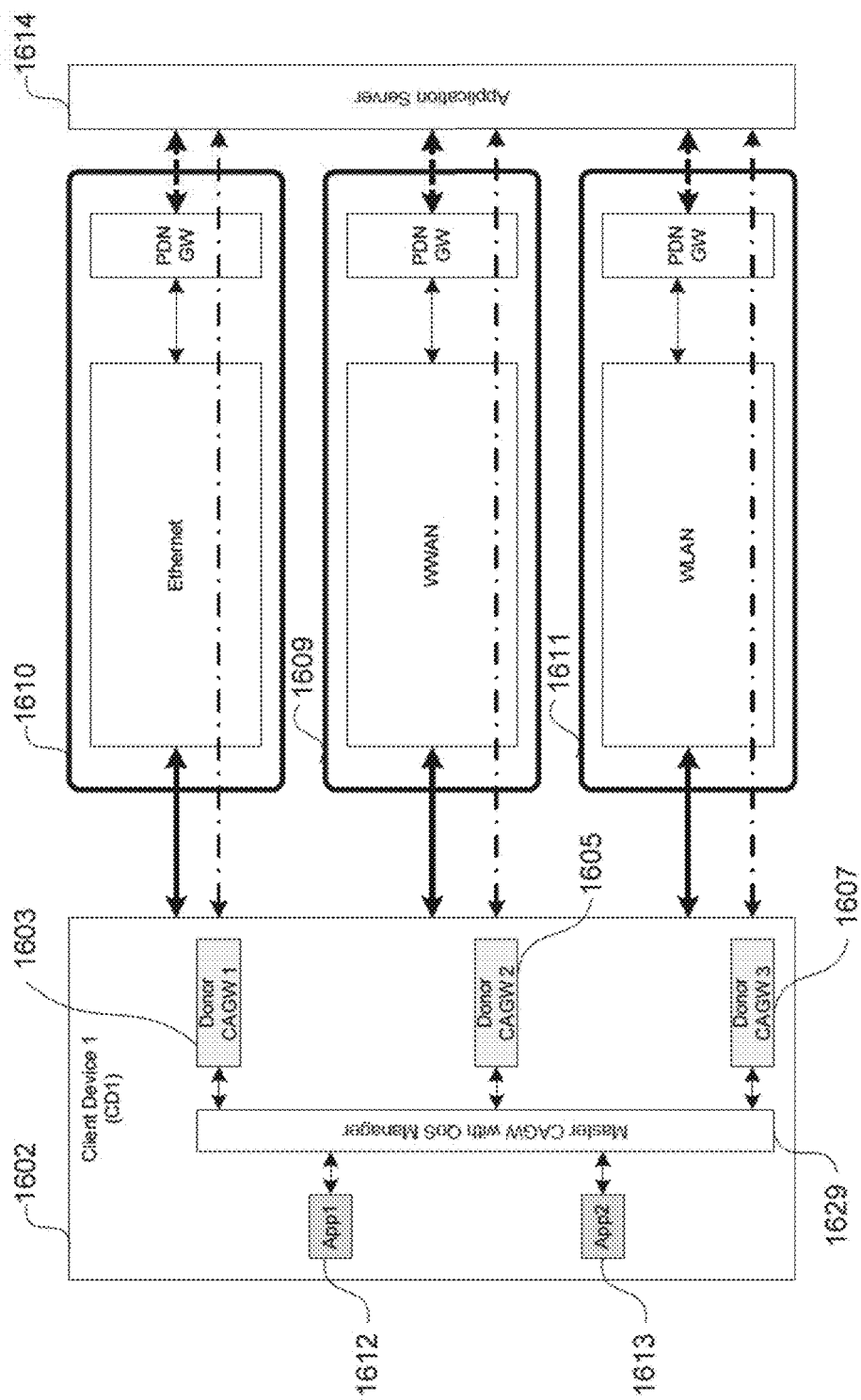
FIG. 16 illustrates a use case of a single client device capable of MB connection over different WWAN, WLAN, and Wired (Ethernet) networks using the internet service from all three sources simultaneously and then pooling and distributing it to the two applications running on the same client device while ensuring Quality of Service (QoS) requirements are met according to the aspects of the present disclosure.

Some client devices may have access to internet service from multiple sources, e.g., WWAN, WLAN, Ethernet, DSL, Cable Modem, etc. According to an aspect of the present disclosure, a single client device may use internet service from all the sources simultaneously and may enter into the PD mode of operation in order to share the internet service with applications running in the client device. In this mode of operation, the establishment of PD mode requires coordination only across different modems corresponding to different networks within the client device and does not have any dependency on any of the network elements or any other client devices. The client device with internet service from multiple sources plays the role of Master CAGW and also plays the role of the Donor CAGW. According to an aspect of the present disclosure, there may be a CAGW entity associated with each source of the internet service which in turn communicates with the Master CAGW which performs the pooling and distribution (PD) mode of operation. An example of this mode of operation is illustrated in FIG. 16. In the present example, the client device CD1 1602 has access to internet service from the Ethernet 1610, the WWAN 1609, and the WLAN 1611. All three networks are connected to the Application Server 1614 through their respective PDN GWs. The client device CD1 1602 operates three different instances of the Donor CAGWs 1603, 1605 and 1607 associated with the three different sources of internet Ethernet, WWAN and WLAN respectively. The Master CAGW including the QoS Manager 1629 may perform the coordination for the PD mode of operation. In this case the PD mode of operation entails selection of one of the internet service from three different sources by the Master CAGW and associating it with different applications App1 1612 and App2 1613 that may be running. According to an aspect of the present disclosure, the Master CAGW in conjunction with the QoS Manager may perform the PD mode of the internet service according to the QoS of each application. For example, if the App1 1612 needs higher data rate than App2 1613, the Master CAGW 1629 may provide the internet service from Ethernet 1610 to the App1 1612 and provide the internet service from WWAN 1609 to the App2 1613. The Master CAGW and QoS Manager 1629 may dynamically update the nature of the pooling and distribution based on the QoS of the current and any new applications that may be started by the user. Unlike the PD mode of operation that includes the NAGW on the network side, in the PD mode illustrated in FIG. 16 which does not involve NAGW, the pooling and distribution of the internet service may be achieved in a client device by selecting different sources of internet service for different applications.

Figure 17:
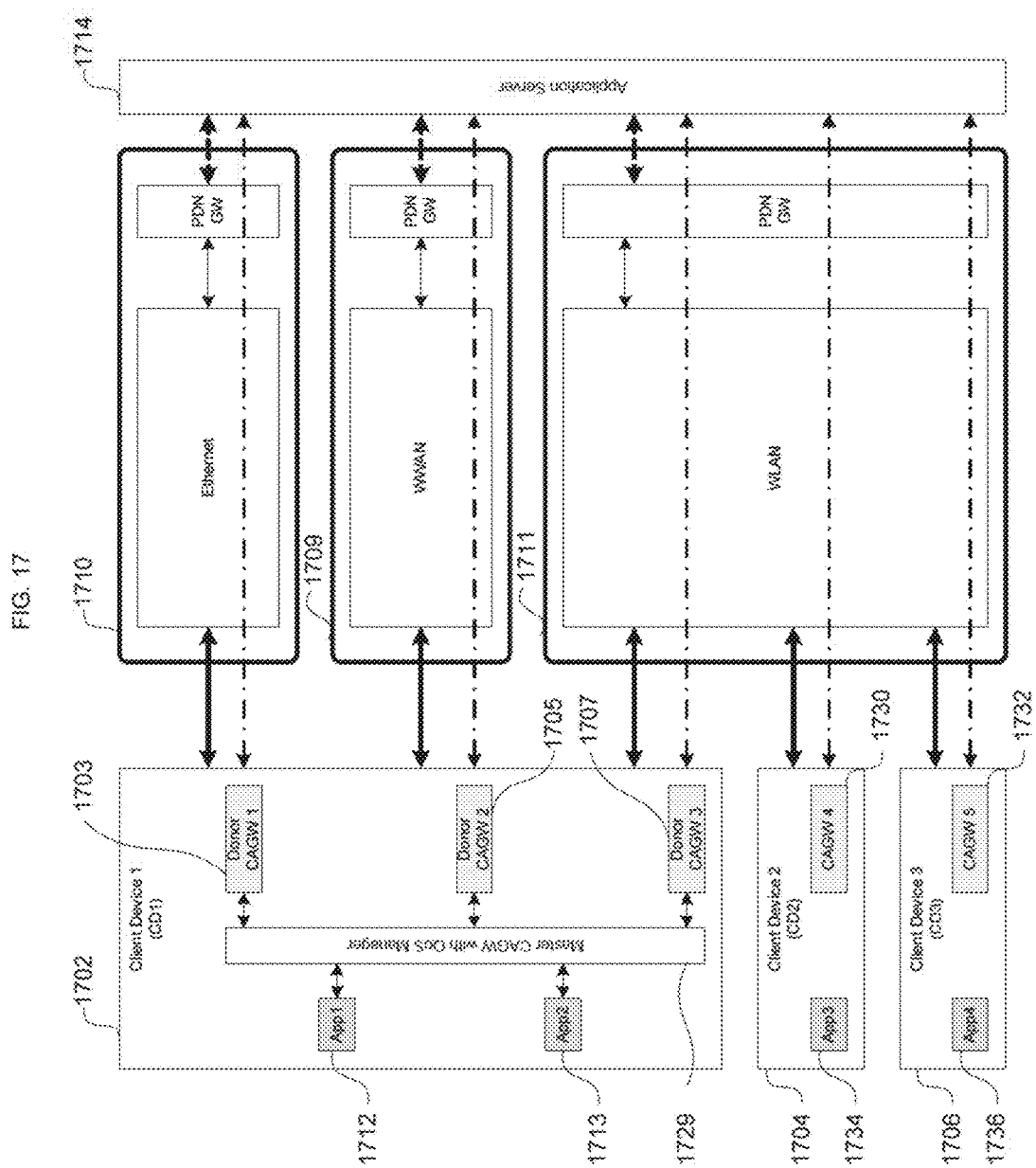
FIG. 17 illustrates a use case of a single client device capable of MB connection over different WWAN, WLAN, and Wired (Ethernet) networks using the internet service from all three sources simultaneously and then pooling and distributing it to the two applications running on the same client device and also distributing it to two other client devices on the same SRL while ensuring QoS requirements are met according to the aspects of the present disclosure.

According to an aspect of the present disclosure, a single client device may use internet service from all the sources simultaneously and may enter into the PD mode of operation in order to share the internet service with one or more applications running in the client device while also sharing the internet service to other client devices that may be connected to the local network (SRL). In this mode of operation, the establishment of PD mode requires coordination across different modems corresponding to different networks within the client device and coordination across other client devices on the SRL but does not have any dependency on any of the network elements. According to an aspect of the present disclosure, the client device with multiple sources of internet service plays the role of Master CAGW and also plays the role of the Donor CAGW. An example of this mode of operation is illustrated in FIG. 17. In the present example, the client device CD1 1702 has internet service from the Ethernet 1710, the WWAN 1709, and the WLAN 1711. All three networks are connected to the Application Server 1714 through their respective PDN GWs. The client device CD1 1702 operates three different instances of the Donor CAGWs 1703, 1705 and 1707 associated with the three different sources of internet Ethernet, WWAN and WLAN respectively. The Master CAGW including the QoS Manager 1729 performs the coordination for the PD mode of operation. In this case the pooling of the internet service from three different sources is done by the Master CAGW and the distribution is done for the two different applications App1 1712 and App2 1713 that may be running. In this case the PD mode of operation entails selection of one of the internet service from different sources by the Master CAGW and associating it with different applications within one client device and across other client devices, but one application can be associated with only one internet service at a given time. The client device CD2 1704 is connected to the WLAN 1711 and it runs the CAGW 1730 and the application App3 1734. The client device CD3 1706 is connected to the WLAN 1711 and it runs the CAGW 1732 and the application App4 1736. The Master CAGW 1729 in client device CD1 1702 may initiate the PD mode of operation and may perform coordination with the Donor CAGWs 1730 and 1732 in client devices CD2 and CD3 respectively through the WLAN 1711.

According to an aspect of the present disclosure, the Master CAGW and QoS Manager 1729 in the client device CD1 1702 performs the coordination with the Donor CAGWs corresponding to its different modems as well as with the CAGWs 1730 and 1732 in the client devices 1704 and 1706. According to an aspect of the present disclosure, the Master CAGW and QoS Manager 1729 may pool the internet service from two or more of its internet sources and share it with App3 1734 and App4 1736 in client devices 1704 and 1706 respectively while simultaneously providing internet service to its own applications App1 1712 and App2 1713. For example, the Master CAGW and QoS Manager 1729 may provide internet service to the App1 1712 and App2 1713 of client device CD1 1702 through the Ethernet network 1710 and it may provide internet service to App3 1734 in client device CD2 1704 and the App4 1736 in client device CD3 1706 through the WWAN 1709.

According to an aspect of the present disclosure, the Master CAGW in conjunction with the QoS Manager performs the pooling and distribution of the internet service according to the QoS of each application. For example, if the App1 1712 needs higher data rate than App2 1713, the Master CAGW 1729 may pool the internet service from Ethernet 1710 and WLAN 1711 and provide it to the App1 1712 and provide the internet service from WWAN 1709 to the App2. Unlike the PD mode of operation that may include the NAGW on the network side, the granularity of the pooling and distribution of the internet service may be limited, for example, only pooling of two or more services onto a single application may not be feasible.

Figure 19:
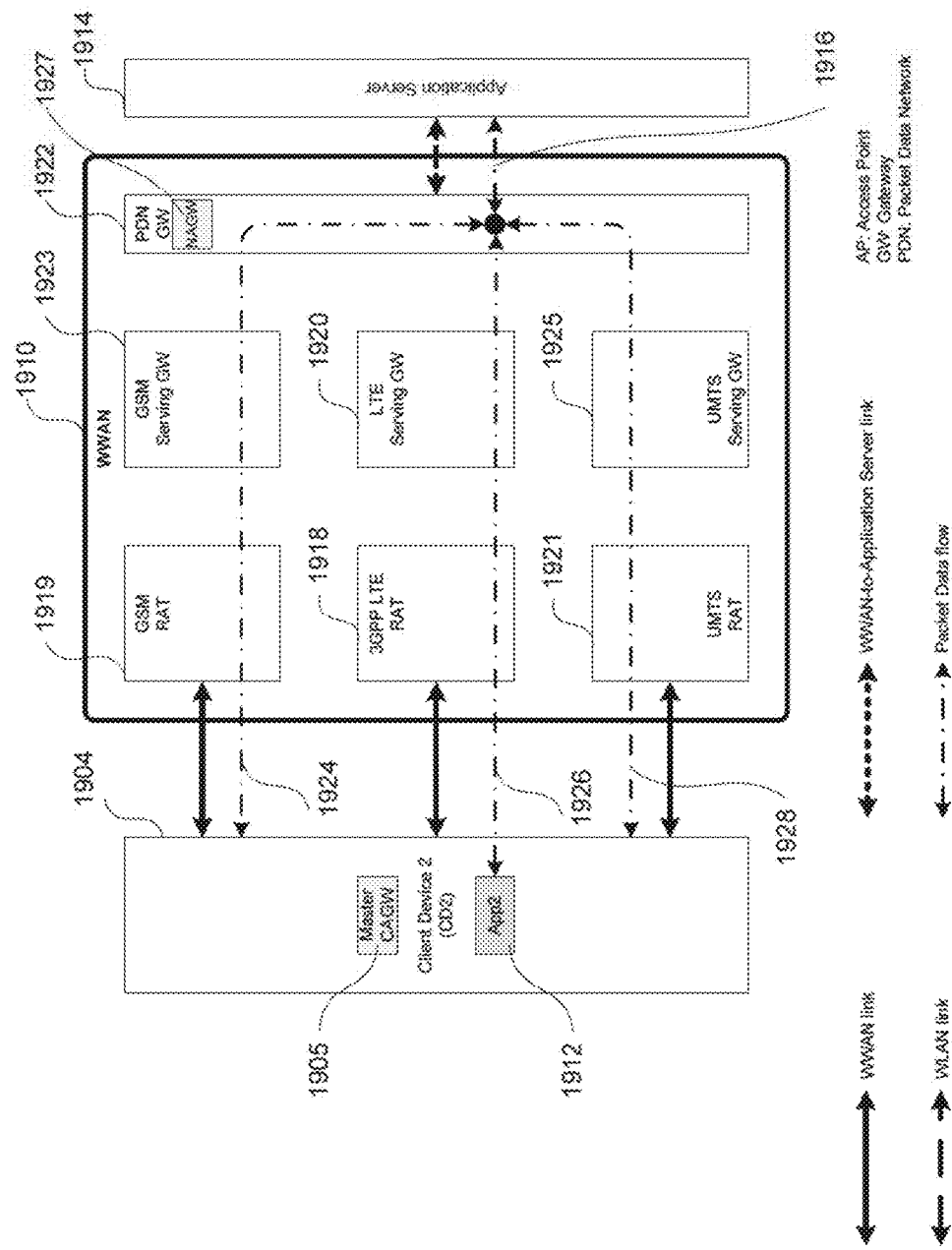
FIG. 19 illustrates a use case of single client device capable of MB connection over different WWANs with the same or different RATs performing the pooling and distributing internet service from the multiple WWANs to one or more applications within the client device according to the aspects of the present disclosure.

The PD mode of operation may be possible for the case of a single client device with access to multiple internet service sources from a single WWAN operator. For example, a client device may have access to internet service from a 4G RAT, a 3G RAT, and a 2G RAT of the same WWAN. According to an aspect of the present disclosure, a single client device with access to two or more sources of internet service through different RATs of the same WWAN may enter PD mode of operation with the WWAN across two or more RATs. This PD mode of operation is illustrated in FIG. 19 for the example case of a single client device CD2 1904 with access to internet service from 3GPP LTE RAT 1918, the UMTS RAT 1921, and the GSM RAT 1919 of the same WWAN 1910 with PDN GW 1922 connected to the Application Server 1914 through their respective Serving GWs 1920, 1925, and 1923. According to an aspect of the present disclosure, a single CAGW may be used in a client device and it may play the role of the Master CAGW. According to an aspect of the present disclosure, the Master CAGW may coordinate with the NAGW in the PDN GW for the PD mode of operation with the respective parameters for each RAT. In FIG. 19, the Master CAGW 1905 is located inside the client terminal CD2 1904 and the NAGW 1927 is located inside the PDN GW 1922. According to an aspect of the present disclosure, based on the capability of a client device, the Master CAGW may communicate, during the coordination for PD mode operation, to the NAGW about the RATs through which the client terminal may be able to access internet service simultaneously. According to an aspect of the present disclosure, after the coordination for the PD mode of operation is completed, the data packet flow from the Application Server to the client device may go through the RATs which may be simultaneously active for the particular client device. For the example in FIG. 19, the client device is illustrated to have the internet access through the 3GPP LTE, UMTS, and GSM RATs. According to an aspect of the present disclosure, the NAGW in PDN GW may route the data packets through different RATs according to the separate IP address for the client device corresponding to each of the RATs. According to an aspect of the present disclosure, the Master CAGW in the client device may collect the data packets received from the different RATs and may order them according to the sequence numbers from the Application Server's protocol entities and eventually may provide the ordered data packets to the application. For the example in FIG. 19, the three different paths for the data packet flow are illustrated as 1924, 1926, and 1928 through the GSM, 3GPP LTE, and UMTS RATs. The Master CAGW 1905 may collect and order the data packets and provide them to the application App2 1912. In a similar manner, according to an aspect of the present disclosure, the UL data packets are routed by the Master CAGW through the different RATs which are eventually collected and ordered by the NAGW and provided to the Application Server.

According to an aspect of the present disclosure, one or more RATs may be removed, either by the Master CAGW in the client device or by the NAGW in the PDN GW, from the PD mode of operation after first having entered the PD mode of operation. According to an aspect of the present disclosure, one or more RATs may be added, by the Master CAGW in the client device, to the PD mode of operation after first having entered the PD mode of operation. According to an aspect of the present disclosure, the NAGW in PDN GW may accept, modify, or reject the PD mode request from a client device. For example, the NAGW in the PDN GW may support or allow PD mode of operation with 3GPP LTE and UMTS RATs only. If a client device request PD mode of operation with 3GPP LTE, UMTS, and GSM RATs, the NAGW may accept the PD mode request with only 3GPP LTE and UMTS RATs.

Figure 20:
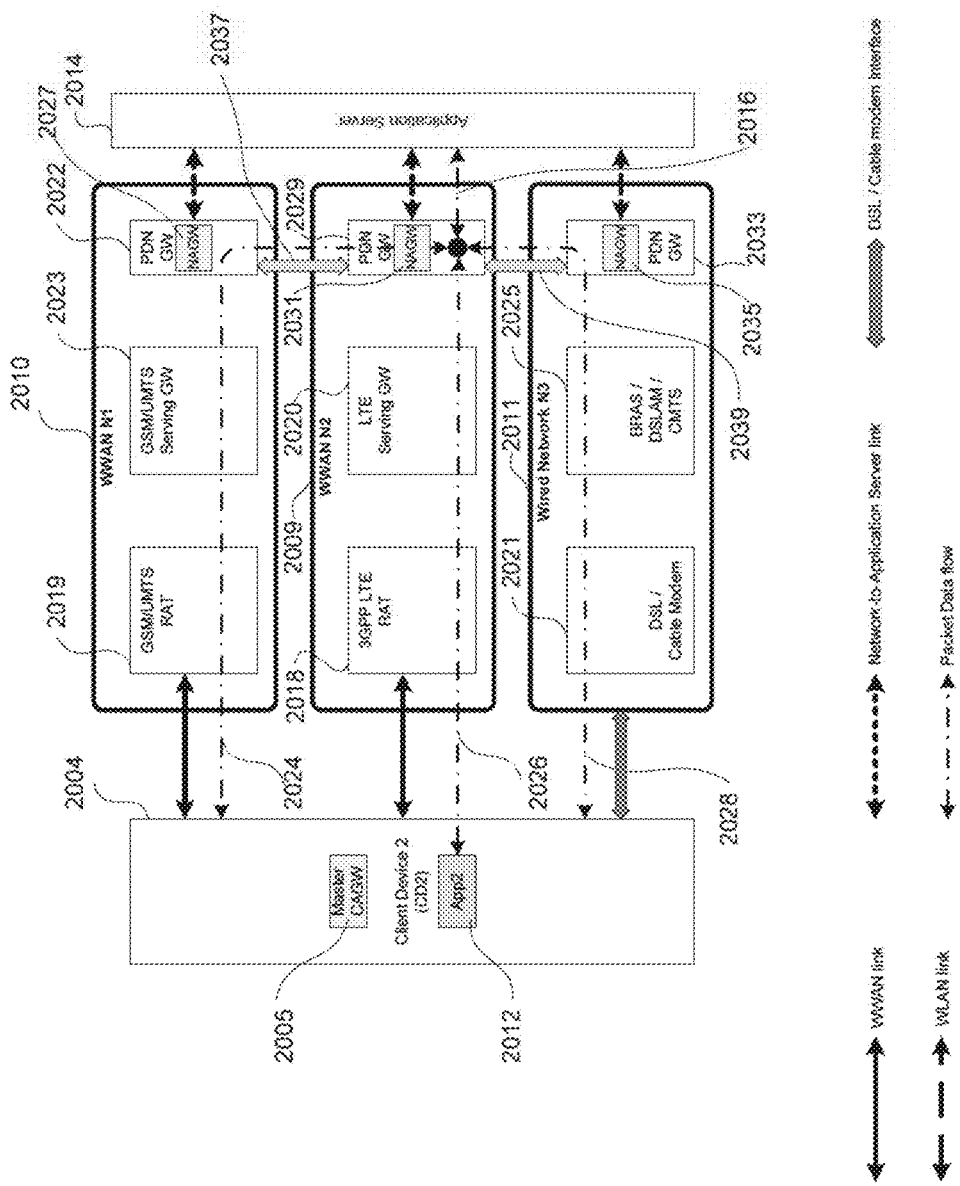
FIG. 20 illustrates a use case of single client device capable of MB connection over different WWANs with the same or different RATs and having internet service through wired networks performing the pooling and distributing internet service from the multiple WWANs to one or more applications within the client device according to the aspects of the present disclosure.

The PD mode of operation may be possible for the case of a single client device with access to multiple internet service from multiple RATs as well as from a wired network such as a DSL or Cable Modem. According to an aspect of the present disclosure, a single client device with access to two or more sources of internet service through different wired and wireless networks may enter PD mode of operation across the different networks. This PD mode of operation is illustrated in FIG. 20 for the example case of a single client device CD2 2004 with access to internet service from three different networks namely, WWAN N1 2010, WWAN N2 2009, and Wired Network N3 2011. The WWAN N1 2010 may include the GSM/UMTS RAT 2019, the GSM/UMTS Serving GW 2023, and the PDN GW 2022. Similarly, the WWAN N2 may include the 3GPP LTE RAT 2018, the LTE Serving GW 2020, and the PDN GW 2029. The Wired Network N3 may include the DSL/Cable Modem 2021, BRAS/DSLAM/CMTS 2025, and the PDN GW 2033. The PDN GW of each three networks is connected to the Application Server 2014. The PDN GW of each of the network may be connected to each other through the interfaces 2037 and 2039.

According to an aspect of the present disclosure, a single CAGW may be used in a client device and it may play the role of the Master CAGW. According to an aspect of the present disclosure, there may be separate NAGW in the PDN GW of each network that may be participating in PD mode of operation. According to an aspect of the present disclosure, the Master CAGW in the client device may coordinate with the NAGW in each of the PDN GW for the PD mode of operation with the respective parameters for each network. In FIG. 20, the Master CAGW 2005 is located inside the client terminal CD2 2004, for WWAN N1 2010 the NAGW 2027 is located inside the PDN GW 2022, for WWAN N2 2009 the NAGW 2031 is located inside the PDN GW 2029, and for the Wired Network N3 the NAGW 2035 is located inside the PDN GW 2033.

According to an aspect of the present disclosure, based on the capability of a client device, the Master CAGW may communicate, during the coordination for PD mode of operation, to the NAGW of each network through which the client terminal may be able to access internet service simultaneously. According to an aspect of the present disclosure, after the coordination for the PD mode of operation is completed, the data packet flow from the Application Server to the client device may go through the networks which may be simultaneously active for the particular client device. For the example in FIG. 20, the client device CD2 2004 is illustrated to have the internet access through the WWAN N1 2010, WWAN N2 2009, and Wired Network N3 2011. According to an aspect of the present disclosure, the NAGWs in each of the PDN GWs may route the data packets through their respective networks according to the separate IP address for the client device corresponding to each of the networks. According to an aspect of the present disclosure, the Master CAGW in the client device may collect the data packets received from the different networks and may order them according to the sequence numbers from the Application Server's protocol entities and eventually may provide the ordered data packets to the application. For the example in FIG. 20, the three different paths for the data packet flow are illustrated as 2024, 2026, and 2028 through the WWAN N1, WWAN N2, and Wired Network N3. The Master CAGW 2005 may collect and order the data packets and provide them to the application App2 2012. In a similar manner, according to an aspect of the present disclosure, the UL data packets are routed by the Master CAGW through the different networks which are eventually collected and ordered by the NAGW and provided to the Application Server.

According to an aspect of the present disclosure, for the scenarios involving multiple PDN GWs with their corresponding separate NAGWs, the Master CAGW in a client device may select one of the NAGWs as the Master NAGW for the purpose of collecting and ordering the data packets to and from Application Server and the NAGWs of other networks participating in the PD mode of operation. According to an aspect of the present disclosure the NAGW in some or all the PDN GWs may be capable of taking the role of a Master NAGW. According to an aspect of the present disclosure, the Master NAGW communicates and coordinates with other NAGWs participating in the PD mode of operation for the purpose of collecting and ordering the data packets to and from Application Server and client devices. According to an aspect of the present disclosure, a client device may select the NAGW in the PDN GW of its home network (the default network to which it subscribes) as the Master NAGW. According to an aspect of the present disclosure, a network may designate a particular NAGW, from a set of NAGWs it may have deployed, as the Master NAGW. The IP address and other information about the PDW GW with the Master NAGW may be broadcast or unicast to client terminals. According to an aspect of the present disclosure, the Master CAGW in a client device may not necessarily be directly communicating with the Master CAGW for the PD mode of operation. For example, the Master CAGW in a client device may communicate directly to the NAGW in the PDN GW of its home network which in turn may communicate with the Master CAGW. The role of a Master CAGW may be necessary in scenarios where the PD mode of operation involves multiple wired or wireless networks such as in the examples illustrated by FIG. 13, FIG. 14, and FIG. 20.

According to an aspect of the present disclosure, one or more networks may be removed, either by the Master CAGW in the client device or by the Master NAGW, from the PD mode of operation after first having entered the PD mode of operation. According to an aspect of the present disclosure, one or more networks may be added, by the Master CAGW in the client device, to the PD mode of operation after first having entered the PD mode of operation. According to an aspect of the present disclosure, the Master NAGW in PDN GW may accept, modify, or reject the PD mode of operation request from a client device. For example, the Master NAGW in the PDN GW may support or allow PD mode of operation with WWAN N2 and Wired Network N3 only. If a client device requests PD mode of operation with WWAN N1, WWAN N2, and Wired Network N3, the NAGW may accept the PD mode request with only WWAN N2 and Wired Network N3.

According to an aspect of the present disclosure, a client device may enter PD mode of operation with two different WWANs but both the WWANs may be using the same RAT. For example, a client device may enter PD mode of operation with 3GPP LTE RATs of two different WWANs.

According to an aspect of the present disclosure, the coordination for PD mode of operation may include exchanging the manufacturer information. In some cases the manufacturer and model of a client device may be inferred from its serial number or IMEI. According to an aspect of the present disclosure, the PD mode of operation may be supported across different types of client devices produced by different manufacturers. According to an aspect of the present disclosure, the PD mode of operation may be supported only among the client devices produced by the same manufacturer. According to another aspect of the present disclosure, the PD mode of operation may be enabled only among devices that may be serviced under a single subscription and/or account. For example, a family or business may have multiple client devices serviced under a single subscription and/or account and the PD mode of operation may be supported only among those devices. Alternatively, an individual may have multiple client devices, such as a smartphone, a tablet, and a smart watch under a single subscription and they may participate in PD mode of operation only amongst those client devices.

According to an aspect of the present disclosure, the PD mode of operation may be supported only when all the client devices are operating with a single network operator. For example, the client devices connected to an SRL may enter PD mode of operation only with client devices that have the WWAN connection with the same WWAN operator. In another example, the wire-line internet service (e.g., DSL/Cable Modem) and the wireless internet service (WWAN) may be provided by a single internet service provider. According to an aspect of the present disclosure, the PD mode of operation may be supported across different networks only when the networks are operated by the same network operator.

A client device may sometimes enter a geographic area where there is no internet service from the WWAN operator to which it has subscribed. However, there may be internet service available from other WWAN operators. Depending on the type of subscription and service agreements between WWAN operators, a client device may be able to get service from WWAN operators other than the one to which it has subscribed. This is often referred to as roaming. According to an aspect of the present disclosure, the PD mode of operation may be supported in scenarios where a client terminal may be roaming. Alternatively, according to an aspect of the present disclosure, a client device may be configured such that it may not support PD mode of operation when it is roaming. According to an aspect of the present disclosure, a roaming client device may be configured such that it may support PD mode of operation only when it may play the role of a Master CAGW but not a Donor CAGW.

The PD mode of operation may use end-to-end security such that even when the data packets of one client device may be traversing through another client device, the latter may neither be able to view or store the data packets in any way nor may it forward the data packets to any other client device or network entity.

By way of example only, the above-described method CAGW processing block may be implemented in a client device such as CD1 1002 in FIG. 10. The CAGW processing block may play the role of a Master CAGW or a Donor CAGW depending on the operating scenario. The CAGW processing block may include elements that are common as well as specific to the Donor CAGW and Master CAGW functions.

Figure 21:
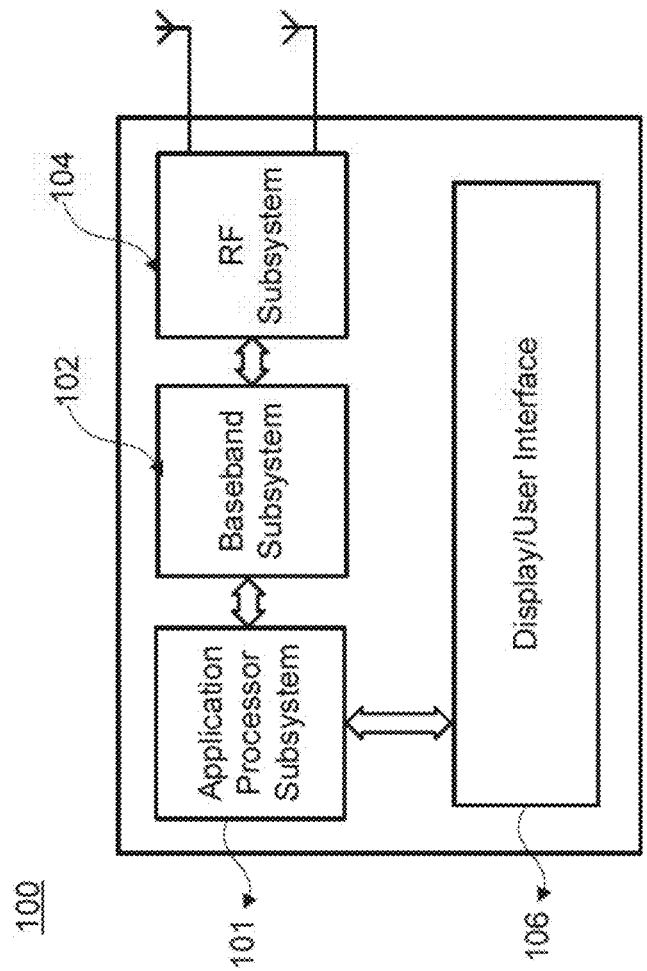
FIG. 21 illustrates a wireless mobile station diagram, which may be employed with aspects of the disclosure described herein.
Figure 22:
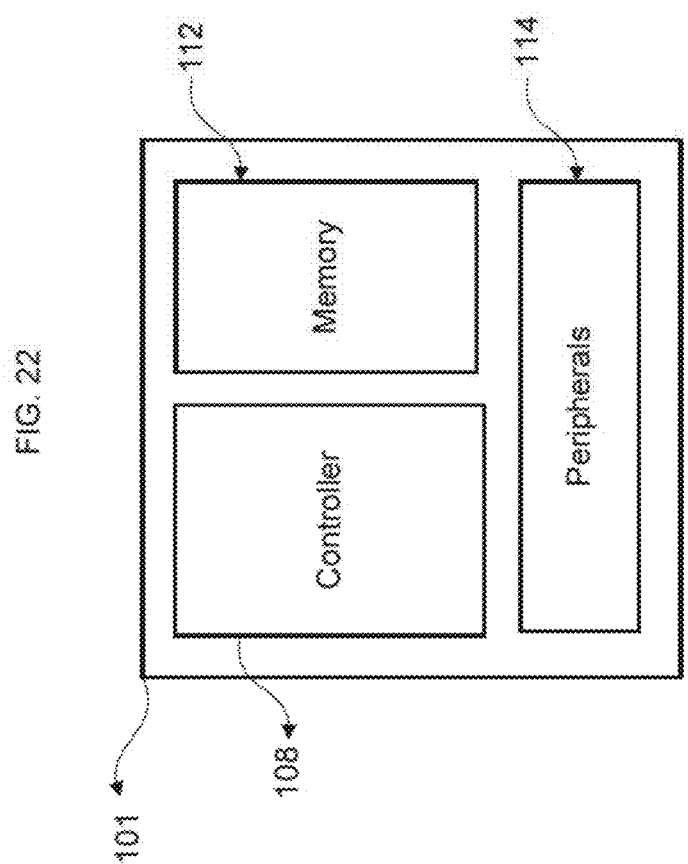
FIG. 22 illustrates an application processor subsystem for a wireless mobile station, which may be employed with aspects of the disclosure described herein.

As shown in FIG. 21, client device 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 may all be integrated as one integrated chip. The application processor subsystem 101 of FIG. 21 as detailed in FIG. 22 may include a controller 108 such as a microcontroller, another processor or other circuitry, memory 112 and peripherals 114. The controller 108 desirably handles overall operation of the client device 100. This may be done by any combination of hardware, software and firmware running on the controller 108. Such a combination of hardware, software and firmware may embody any methods in accordance with aspects of the present disclosure. In FIG. 22, the peripherals 114 such as a full or partial keyboard, video or still image display, audio interface, one or more SIM interfaces, etc. may be employed and managed through the controller 108.

Figure 23:
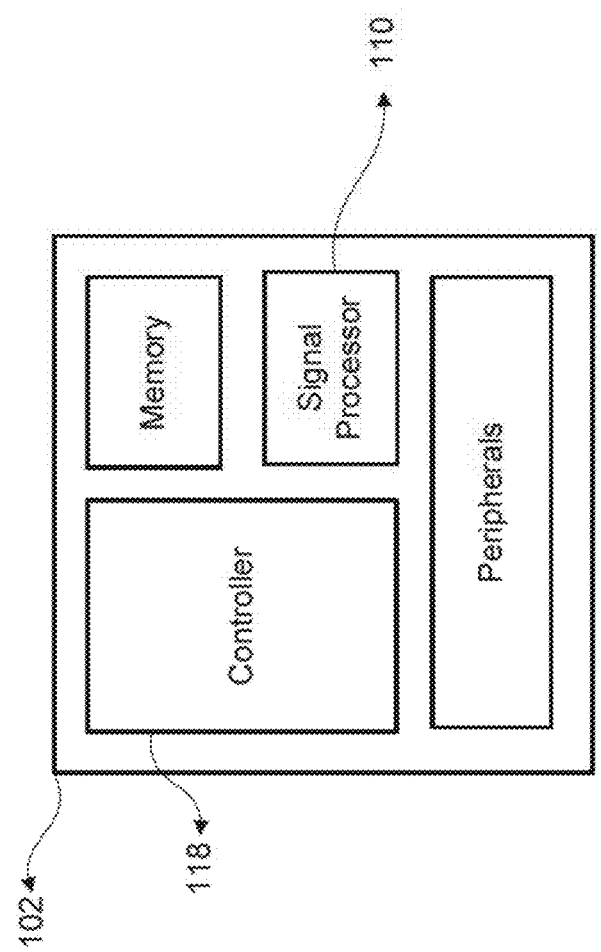
FIG. 23 illustrates a baseband subsystem for a wireless mobile station, which may be employed with aspects of the disclosure described herein.

The baseband subsystem 102 of FIG. 21 as detailed in FIG. 23 may include a controller 118 such as a microcontroller or other processor, a signal processor 110, memory, and peripherals. Aspects of the present disclosure may be implemented in firmware of the controller 108 of the application processor in FIG. 22 and/or the controller 118 of the baseband subsystem in FIG. 23. In another alternative, aspects of the present disclosure may also be implemented as a combination of firmware and hardware of the application processor subsystem 101 of FIG. 22 and/or the baseband subsystem 102 of FIG. 23. For instance, a signal processing entity of any or all of the FIG. 23 may be implemented in firmware, hardware and/or software. It may be part of the baseband subsystem, the receiver subsystem or be associated with both subsystems. In one example, the controller 118 and/or the signal processor 110 in FIG. 23 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

Figure 24:
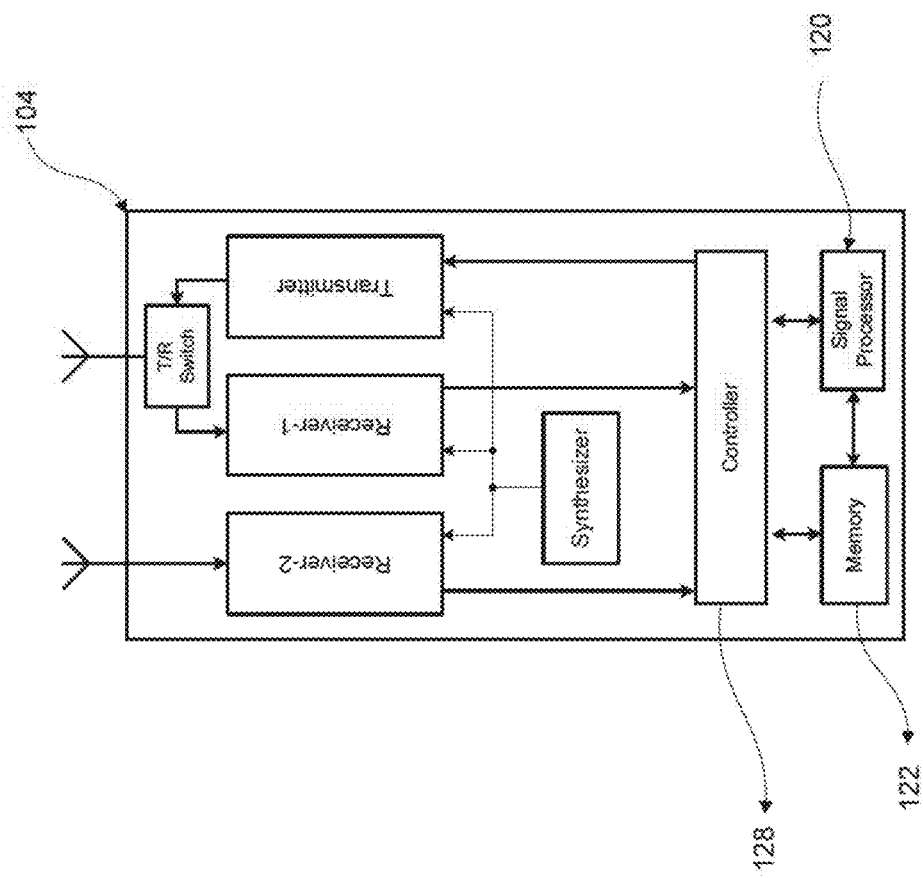
FIG. 24 illustrates a radio frequency (RF) subsystem for a wireless mobile station, which may be employed with aspects of the disclosure described herein.

The RF subsystem 104 of FIG. 21 as detailed in FIG. 24 may include a controller 128 such as a microcontroller, another processor or other circuitry. It may include memory 122 and a signal processor 120.

The consumer electronics devices that may use this disclosure may include smartphones, tablets, laptops, gaming consoles, cameras, video camcorders, car entertainment systems, etc.

Figure 25:
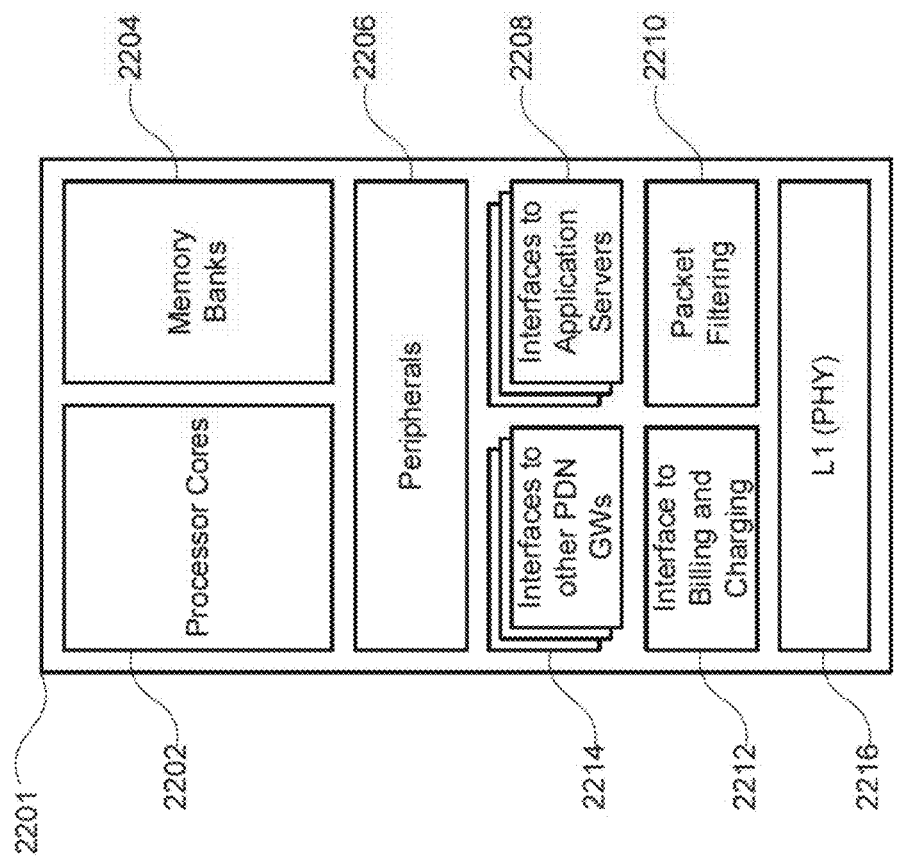
FIG. 25 illustrates a Packet Data Network (PDN) Gateway (GW) block diagram, which may be employed with aspects of the disclosure described herein.

By way of example only, the above-described method of the NAGW processing block may be implemented inside a PDN GW such as 1022 in FIG. 10. In addition to NAGW, a PDN GW may support mobility between 3GPP and non-3GPP networks. A PDN GW of a network may provide connectivity from client devices to other PDNs, such as internet, by being the point of entry or exit of data packet traffic. The PDN GW functions may include: per-user based data packet filtering, Lawful Interception (LI), client device IP address allocation, transport level data packet marking in the uplink and downlink, e.g. for QoS, accounting for inter-operator charging, uplink and downlink service level charging, uplink and downlink service level gating control, uplink and downlink service level rate enforcement. A block diagram of an example PDN GW is illustrated in FIG. 25. As shown in FIG. 25, a PDN GW 2201 may include one or more processor cores 2202, memory banks 2204, and peripherals 2206. In addition a PDN GW may include one or more "Interfaces to other PDN GWs" 2214 and one or more "Interfaces to Application Servers" 2208. A PDN GW may include "Interface to Billing and Charging" 2212 for communicating with corresponding processing entities of a network. While many of the functions of a PDN GW may be implemented in software, some processing function may be implemented in hardware, e.g., the per-user data packet filtering may be implemented in "Packet Filtering" hardware block 2210. Similarly the processing block L1 (PHY) 2216 may be a hardware block performing the layer 1 (physical layer) processing. Alternatively, some of the processing may be performed in a signal processor, an FPGA or an ASIC. The NAGW processing block may be implemented as software, hardware or some combination of the two and the hardware may be a signal processor, FPGA, or ASIC. Some of the hardware blocks may include the RF, antennas, and other analog components. Some of the interfaces of the PDN GW may be wireless and some may be wire-line including optical fiber. Some of the wireless interfaces may use line-of-sight (LOS) microwave links.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in other embodiments described herein.

The invention claimed is:

1. A method for controlling connection pooling and distribution of internet service from a plurality of communication networks available respectively at a plurality of client devices,
   in which the client devices are configured to access a Hotspot Access Point via respective Short Range Links (SRLs) and participate in a pooling and distribution (PD) mode of operation as part of a PD group,
   in which the PD group includes a first client device of the client devices and at least one second client device of the client devices,
   in which the internet service from a first communication network of the plurality of communication networks is available at the first client device, and
   in which in the PD mode operation for the PD group, the internet service from at least one second communication network of the plurality of communication networks available at the at least one second client device is shared with the first client device according to a first coordination request from a Master Client Application Gateway (CAGW) of the first client device to a Donor CAGW of the at least one second client device requesting the Master CAGW be a beneficiary of the internet service from the at least one second communication network available at the at least one second client device, the method comprising:
   controlling, by a processing device as a first Network Application Gateway (NAGW) of the first communication network,
      in response to a second coordination request from the Master CAGW when coordination between the Master CAGW and the Donor CAGW of the at least one second client device according to the first coordination request is successfully completed, coordinating for sharing the internet service from the at least one second communication network in the PD mode of operation for the PD group,
      wherein the coordinating for sharing includes receiving from the Master CAGW, via the first communication network, data transfer coordination information for the at least one second communication network and the at least one second client device,
      wherein the coordinating for sharing includes exchanging coordination parameter information including the data transfer coordination information with at least one second NAGW of the at least one second communication network, via at least one second interface between the first NAGW and the at least one second NAGW, for coordinating data transfer with the Donor CAGW of the at least one second client device to share the internet service from the at least one second communication network available at the at least one second client device, such that, in the PD mode of operation for the PD group,
      a first given data packet intended for the first client device is transmitted from an Application Server to the first NAGW, is transmitted by the first NAGW to a Packet Data Network (PDN) Gateway (GW) of a given one of the at least second communication network, is transmitted via the internet service from the given one of the at least one second communication network available at a given one of at least one second client device to the Donor CAGW of the given one of the at least one second client device, and is transmitted by the Donor CAGW of the given one of the at least one second client device via the Hotspot Access Point to the Master CAGW of the first client device, and a second given data packet from the Master CAGW of the first client device is transmitted via the Hotspot Access Point to the Donor CAGW of the given one of the at least one second client device, is transmitted by the Donor CAGW of the given one of at least one second client device via the internet service from the given one of the at least one second communication network available at the given one of at least one second client device to the PDN GW of the given one of the at least second communication network, is transmitted from the PDN GW of the given one of the at least second communication network to the first NAGW, and is transmitted from the first NAGW to the Application Server.

2. The method of claim 1, wherein the first and the at least one second communication networks are different first and second Wireless Wide Area Networks (WWANs), and wherein the first and the at least one second communication networks have a same or different type of radio access technology (RAT).

3. The method of claim 1, wherein the first NAGW and the at least one second NAGW are included in a first PDN GW and at least one second PDN GW, respectively.

4. The method of claim 1, wherein the first and the at least one second communication networks are different network types, in which the network types include at least two of a wire-line network, a satellite communication network and a Wireless Wide Area Network (WWAN).

5. The method of claim 1, wherein the processing device is inside a PDN GW of a Wireless Wide Area Network (WWAN) as the first communication network at an Internet Protocol (IP) layer.

6. The method of claim 1, wherein the processing device is in an apparatus in a data packet flow path between the client devices and the Application Server.

7. The method of claim 1, wherein the coordinating for sharing the internet service from the at least one second communication network includes receiving, from the Master CAGW of the first client device, information including at least one of Media Access Control (MAC) addresses, IP addresses, International Mobile Subscriber Identity (IMSI), Download (DL) bandwidth to be shared, actual DL bandwidth shared or Upload (UL) bandwidth to be shared of the at least one second client device.

8. The method of claim 7, wherein the coordinating for sharing the internet service from the at least one second communication network includes receiving, from the Master CAGW of the first client device, information indicating a portion of the internet service from the at least one second communication network available at the at least one second client device to be shared in the PD mode of operation.

9. The method of claim 1, further comprising:
controlling, by the processing device,
coordinating the PD mode of operation for the PD group with the Master CAGW of the first client device to complete the coordinating for sharing the internet service from the at least one second communication network such that internet data packet transfer via the at least one second communication network in the PD mode of operation for the PD group can begin, in which the Application Server uses an IP address of the first client device as a destination IP address in each data packet transmitted to a PDN GW of the first communication network; and determining routing of each data packet from the Application Server to each of the at least one second client device based on predetermined parameters established during the coordinating for sharing the internet service from the at least one second communication network in the PD mode of operation for the PD group.

10. The method of claim 9, further comprising:
controlling, by the processing device, creating a dedicated PDN connection for each of the at least one second client device and the first client device to route to or from the Master CAGW a first IP data packet belonging to the first client device.

11. The method of claim 10, further comprising:
controlling, by the processing device, using the dedicated PDN connections respectively with the of the at least one second client device and the first client device to (i) identify the first IP data packet belonging to the first client device in the PD mode of operation of the PD group, and (ii) route the first IP data packet from the Master CAGW to the Application Server.

12. The method of claim 1, wherein the processing device is inside a PDN GW of the first communication network as a WWAN at an Internet Protocol (IP) layer,
the method further comprising:
controlling, by the processing device, re-order operations at the IP layer on application level second data packets transmitted in the PD mode operation for the PD group in upload directions via respective dedicated PDN connections.

13. The method of claim 12, further comprising:
controlling, by the processing device, maintaining a timer to discard out of order IP data packets which are pending to be received, to re-order IP layer data packets in an upload direction.

14. The method of claim 1, further comprising:
controlling, by the processing device, terminating the PD mode of operation with a given Donor CAGW of the at the least one second client device when the given Donor CAGW is unresponsive over a predetermined period.

15. The method of claim 14, further comprising:
controlling, by the processing device, when the PD mode of operation with the given Donor CAGW is terminated, informing the Master CAGW about removal of the given Donor CAGW from the PD group.

16. The method of claim 1, further comprising:
controlling, by the processing device, terminating the PD mode of operation with the Master CAGW and each of the Donor CAGW in the PD group, when the Master CAGW is unresponsive over a predetermined period.

17. The method of claim 1, further comprising:
controlling, by the processing device, enabling the PD mode of operation for the PD group.

18. The method of claim 1, wherein a given SRL for a given client device of the client devices is configured by Bluetooth, Zigbee, Ethernet, USB or a Wireless Local access network (WLAN).

19. An apparatus for controlling connection pooling and distribution of internet service from a plurality of communication networks available respectively at a plurality of client devices, in which the client devices are configured to access a Hotspot Access Point via respective Short Range Links (SRLs) and participate in a pooling and distribution (PD) mode of operation as part of a PD group,
in which the PD group includes a first client device of the client devices and at least one second client device of the client devices,
in which the internet service from a first communication network of the plurality of communication networks is available at the first client device, and
in which in the PD mode operation for the PD group, the internet service from at least one second communication network of the plurality of communication networks available at the at least one second client device is shared with the first client device according to a first coordination request from a Master Client Application Gateway (CAGW) of the first client device to a Donor CAGW of the at least one second client device requesting the Master CAGW be a beneficiary of the internet service from the at least one second communication network available at the at least one second client device,
the apparatus configured as a Network Application Gateway (NAGW) of the first communication network and comprising:
circuitry configured to control:
in response to a second coordination request from the Master CAGW when coordination between the Master CAGW and the Donor CAGW of the at least one second client device according to the first coordination request is successfully completed, coordinating for sharing the internet service from the at least one second communication network in the PD mode of operation for the PD group,
wherein the coordinating for sharing includes receiving from the Master CAGW, via the first communication network, data transfer coordination information for the at least one second communication network and the at least one second client device,
wherein the coordinating for sharing includes exchanging coordination parameter information including the data transfer coordination information with at least one second NAGW of the at least one second communication network, via at least one second interface between the first NAGW and the at least one second NAGW, for coordinating data transfer with the Donor CAGW of the at least one second client device to share the internet service from the at least one second communication network available at the at least one second client device, such that, in the PD mode of operation for the PD group,
a first given data packet intended for the first client device is transmitted from an Application Server to the first NAGW, is transmitted by the first NAGW to a Packet Data Network (PDN) Gateway (GW) of a given one of the at least second communication network, is transmitted via the internet service from the given one of the at least one second communication network available at a given one of at least one second client device to the Donor CAGW of the given one of the at least one second client device, and is transmitted by the Donor CAGW of the given one of the at least one second client device via the Hotspot Access Point to the Master CAGW of the first client device, and
a second given data packet from the Master CAGW of the first client device is transmitted via the Hotspot Access Point to the Donor CAGW of the given one of the at least one second client device, is transmitted by the Donor CAGW of the given one of the at least one second client device via the internet service from the given one of the at least one second communication network available at the given one of at least one second client device to the PDN GW of the given one of the at least second communication network, is transmitted from the PDN GW of the given one of the at least second communication network to the first NAGW, and is transmitted from the first NAGW to the Application Server.

20. A wireless communication device comprising:
a receiver to receive a wireless communication; and
a processing device configured for controlling connection pooling and distribution of internet service from a plurality of communication networks available respectively at a plurality of client devices, in which the client devices are configured to access a Hotspot Access Point via respective Short Range Links (SRLs) and participate in a pooling and distribution (PD) mode of operation as part of a PD group,
in which the PD group includes a first client device of the client devices and at least one second client device of the client devices,
in which the internet service from a first communication network of the plurality of communication networks is available at the first client device, and
in which in the PD mode operation for the PD group, the internet service from at least one second communication network of the plurality of communication networks available at the at least one second client device is shared with the first client device according to a first coordination request from a Master Client Application Gateway (CAGW) of the first client device to a Donor CAGW of the at least one second client device requesting the Master CAGW be a beneficiary of the internet service from the at least one second communication network available at the at least one second client device,
wherein the processing device is configured as a Network Application Gateway (NAGW) of the first communication network to control:
in response to a second coordination request from the Master CAGW when coordination between the Master CAGW and the Donor CAGW of the at least one second client device according to the first coordination request is successfully completed, coordinating for sharing the internet service from the at least one second communication network in the PD mode of operation for the PD group,
wherein the coordinating for sharing includes receiving from the Master CAGW, via the first communication network, data transfer coordination information for the at least one second communication network and the at least one second client device,
wherein the coordinating for sharing includes exchanging coordination parameter information including the data transfer coordination information with at least one second NAGW of the at least one second communication network, via at least one second interface between the first NAGW and the at least one second NAGW, for coordinating data transfer with the Donor CAGW of the at least one second client device to share the internet service from the at least one second communication network available at the at least one second client device, such that, in the PD mode of operation for the PD group, a first given data packet intended for the first client device is transmitted from an Application Server to the first NAGW, is transmitted by the first NAGW to a Packet Data Network (PDN) Gateway (GW) of a given one of the at least second communication network, is transmitted via the internet service from the given one of the at least one second communication network available at a given one of at least one second client device to the Donor CAGW of the given one of the at least one second client device, and is transmitted by the Donor CAGW of the given one of the at least one second client device via the Hotspot Access Point to the Master CAGW of the first client device, and a second given data packet from the Master CAGW of the first client device is transmitted via the Hotspot Access Point to the Donor CAGW of the given one of the at least one second client device, is transmitted by the Donor CAGW of the given one of at least one second client device via the internet service from the given one of the at least one second communication network available at the given one of at least one second client device to the PDN GW of the given one of the at least second communication network, is transmitted from the PDN GW of the given one of the at least second communication network to the first NAGW, and is transmitted from the first NAGW to the Application Server.

* * * * *